(12) United States Patent  (10) Patent No.: US 8,514,396 B2
Satoh  (45) Date of Patent: Aug. 20, 2013

(54) COLOR MEASURING DEVICE, IMAGE CAPTURING DEVICE, IMAGE FORMING APPARATUS, COLOR MEASUREMENT METHOD, AND COMPUTER PROGRAM PRODUCT

(75) Inventor: Nobuyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/421,355

(22) Filed: Mar. 15, 2012

(65) Prior Publication Data

US 2012/0236308 A1 Sep. 20, 2012

(30) Foreign Application Priority Data

Mar. 17, 2011 (JP) ................................. 2011-059270
Feb. 27, 2012 (JP) ................................. 2012-040745

(51) Int. Cl.
*G01J 3/46* (2006.01)
(52) U.S. Cl.
USPC ....................................................... 356/402
(58) Field of Classification Search
USPC .............................................. 356/402–425
See application file for complete search history.

(56) References Cited

U.S. PATENT DOCUMENTS

| 5,587,813 | A | 12/1996 | Yamazaki et al. |
| 2008/0239348 | A1* | 10/2008 | Kawai ............................ 358/1.9 |
| 2009/0180156 | A1 | 7/2009 | Yoshimaru et al. |
| 2009/0195843 | A1 | 8/2009 | Satoh et al. |

FOREIGN PATENT DOCUMENTS

| JP | 3129502 B2 | 8/1993 |
| JP | 3545844 B2 | 1/1997 |
| JP | 3964220 B2 | 8/2003 |
| JP | 2009-239419 A | 10/2009 |

OTHER PUBLICATIONS

English language abstract JP-09-018729 (which corresponds to JP-3545844-B2), Jan. 17, 1997.
English language abstract JP-2003-223642 (which corresponds to JP-3964220-B2), Aug. 8, 2003.
English language abstract JP-05-223642 (which corresponds to JP-3129502-B2), Aug. 31, 1993.

* cited by examiner

*Primary Examiner* — Tarifur Chowdhury
*Assistant Examiner* — Abdullahi Nur
(74) *Attorney, Agent, or Firm* — Harness, Dickey & Pierce, P.L.C.

(57) ABSTRACT

A color measuring device includes a storage unit configured to store therein colorimetric values corresponding respectively to colors constituting a reference chart in a predetermined color space that is device-independent; an image capturing unit configured to capture the reference chart and a subject for color measurement simultaneously to acquire RGB values of the reference chart and RGB values of the subject; a search unit configured to search for RGB values of four points corresponding to vertices of a polyhedron in the reference chart, the polyhedron including a specified RGB value of the subject in an RGB color space; a calculating unit configured to calculate a linear transformation matrix for converting the RGB values of the four points into the corresponding colorimetric values; and a conversion unit configured to convert the specified RGB value into a corresponding colorimetric value in the predetermined color space based on the linear transformation matrix.

8 Claims, 25 Drawing Sheets

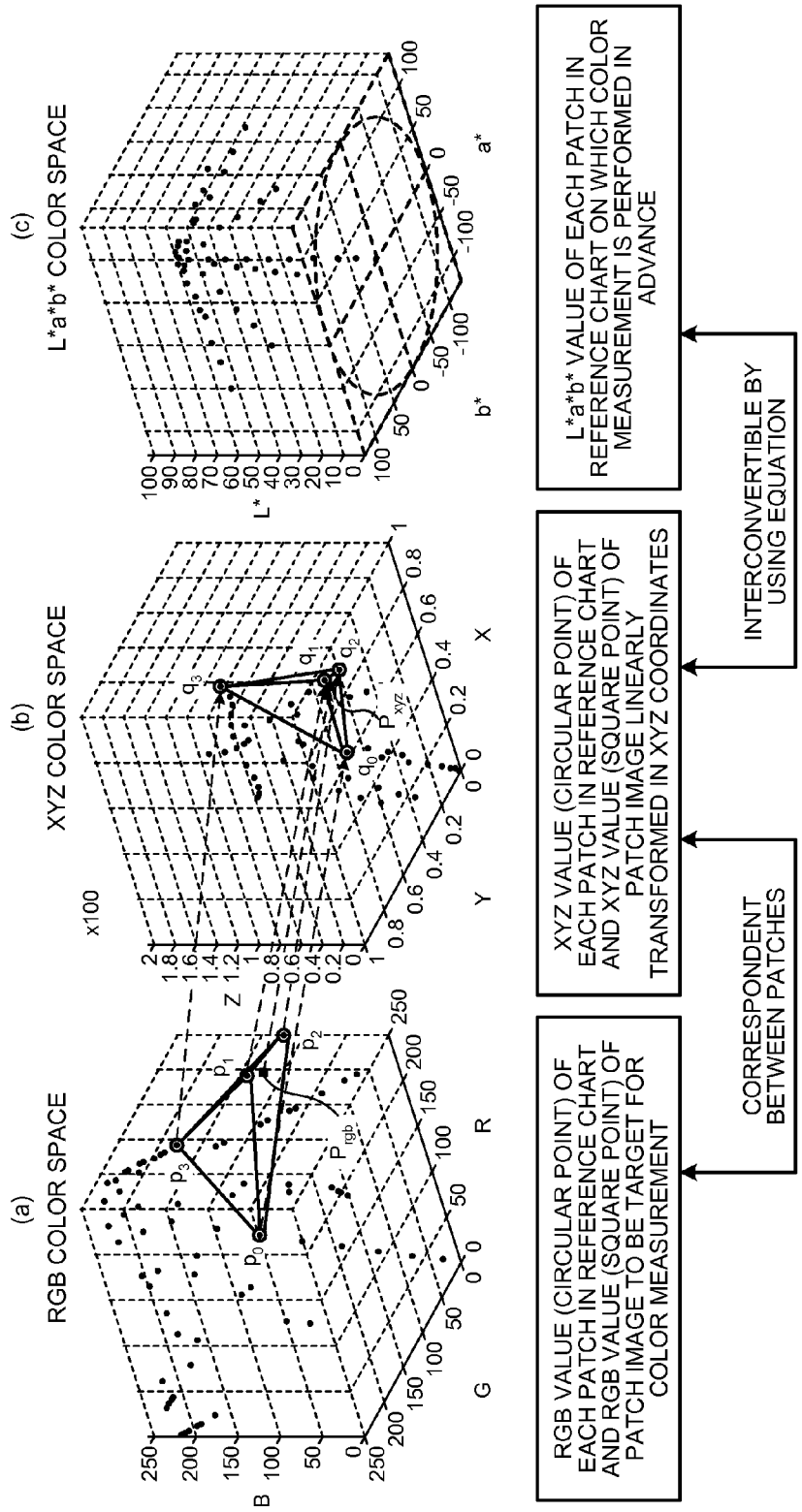

FIG.12A $XYZ \Rightarrow Lab$ $$f_x = \begin{cases} \sqrt[3]{x_r} & x_r > 0.008856 \\ (903.3 \times x_r + 16)/116 & x_r \leq 0.008856 \end{cases}$$

$$f_y = \begin{cases} \sqrt[3]{y_r} & y_r > 0.008856 \\ (903.3 \times y_r + 16)/116 & y_r \leq 0.008856 \end{cases}$$

$$f_z = \begin{cases} \sqrt[3]{z_r} & z_r > 0.008856 \\ (903.3 \times z_r + 16)/116 & z_r \leq 0.008856 \end{cases}$$

$x_r = X/X_r$ $y_r = Y/Y_r$ $z_r = Z/Z_r$ $L = 116 \times f_y - 16$ $a = 500 \times (f_x - f_y)$ $b = 200 \times (f_y - f_z)$

FIG.12B $Lab \Rightarrow XYZ$ $$x_r = \begin{cases} f_x^3 & f_x^3 > 0.008856 \\ (116 \times f_x - 16)/903.3 & f_x^3 \leq 0.008856 \end{cases}$$

$$y_r = \begin{cases} ((L + 16)/116)^3 & L > 903.3 \times 0.008856 \\ L/903.3 & L \leq 903.3 \times 0.008856 \end{cases}$$

$$z_r = \begin{cases} f_z^3 & f_z^3 > 0.008856 \\ (116 \times f_z - 16)/903.3 & f_z^3 \leq 0.008856 \end{cases}$$

$f_x = \dfrac{a}{500} + f_y$ $$f_y = \begin{cases} (L + 16)/116 & y_r > 0.008856 \\ (903.3 \times y_y + 16)/116 & y_r \leq 0.008856 \end{cases}$$

$f_z = f_y - \dfrac{b}{200}$ $X = x_r \times X_r$ $Y = y_r \times Y_r$ $Z = z_r \times Z_r$

FIG.17

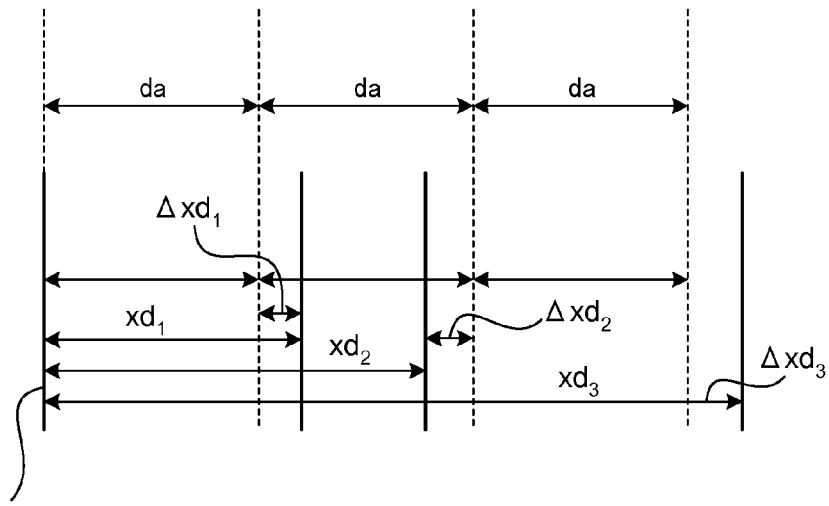

REFERENCE LINE FOR MEASURING POSITIONAL
DEVIATION IN MAIN-SCANNING DIRECTION

FIG.18

FIRST BLACK VERTICAL LINE FORMED ON
THE LEFTMOST SIDE AMONG PATTERNS
FOR MEASURING POSITIONAL DEVIATION IN
MAIN-SCANNING DIRECTION OF PRINT HEAD
LOCATED DOWNSTREAM

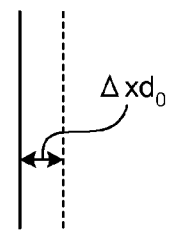

FIRST BLACK VERTICAL LINE FORMED ON
THE LEFTMOST SIDE AMONG PATTERNS
FOR MEASURING POSITIONAL DEVIATION IN
MAIN-SCANNING DIRECTION OF PRINT HEAD
LOCATED UPSTREAM

REFERENCE LINE FOR MEASURING
POSITIONAL DEVIATION IN MAIN-SCANNING
DIRECTION

COLOR MEASURING DEVICE, IMAGE CAPTURING DEVICE, IMAGE FORMING APPARATUS, COLOR MEASUREMENT METHOD, AND COMPUTER PROGRAM PRODUCT

CROSS-REFERENCE TO RELATED APPLICATIONS

The present application claims priority to and incorporates by reference the entire contents of Japanese Patent Application No. 2011-059270 filed in Japan on Mar. 17, 2011 and Japanese Patent Application No. 2012-040745 filed in Japan on Feb. 27, 2012.

BACKGROUND OF THE INVENTION

1. Field of the Invention

The present invention relates to a color measuring device, an image capturing device, an image forming apparatus, a color measurement method, and a computer program product.

2. Description of the Related Art

Inkjet-type image forming apparatuses cause a carriage on which a print head is mounted to reciprocate in a main-scanning direction, and cause the print head to eject ink from nozzle arrays during the reciprocation, thereby printing an image (dots) on a recording medium. Such inkjet-type image forming apparatuses convey the recording medium in a sub-scanning direction by using carriage rollers and the like, and repeat recording in the main-scanning direction, thereby forming an image on the recording medium.

In such an inkjet recording device, the ejection amount of ink ejected from the print head changes because of the state of nozzles in the print head, fluctuation in viscosity of the ink, and fluctuation in a piezoelectric element for driving to eject the ink, for example. As a result, fluctuation occurs in color reproduction of an image formed by the ink ejected from the print head. Furthermore, the ejection amount of ink changes over time in a single device, or varies in different devices. As a result, fluctuation occurs in color reproduction of an image formed by the ink ejected from the print head in this case as well.

To address this, for example, some of the inkjet-type image forming apparatuses described above perform control such that color reproduction of an image formed by the ink ejected from the print head is stabilized by: forming a test pattern to be a target for color measurement on a recording medium; measuring the colors of the test pattern by using a colorimeter; and correcting the ejection amount of ink ejected from the print head based on the result of color measurement of the test pattern.

Examples of the colorimeter described above include a colorimeter that performs color measurement by using a spectroscope, and a colorimeter that performs color measurement by receiving reflected light from the test pattern. These spectroscopes can improve the accuracy in color measurement, but are expensive. Providing such spectroscopes to the image forming apparatus leads to an increase in costs. By contrast, while the spectroscope using reflected light is reasonable in price, the reflected light changes depending on environmental conditions. As a result, the accuracy in color measurement deteriorates.

Therefore, it is necessary to develop a device that is reasonable in price and that performs color measurement with high accuracy.

Japanese Patent Application Laid-open No. 2009-239419 discloses a technology for creating a profile that achieves high color reproducibility. In Japanese Patent Application Laid-open No. 2009-239419, a reference color patch is captured by a spectroscope and a camera, a transformation matrix between a device-dependent color space and a device-independent color space is created, and a more detailed conversion table in the color space is created by using the transformation matrix. Subsequently, an error in the reference color patch converted by the transformation matrix is displayed to enable a user to find the error and correct a profile (conversion table) created from the transformation matrix at his or her judgment. Thus, a profile (conversion table) that achieves high color reproducibility is created.

In the technology disclosed in Japanese Patent Application Laid-open No. 2009-239419, the reference color patch is captured by the spectroscope and the camera, whereby the transformation matrix between the device-dependent color space and the device-independent color space is created. Japanese Patent Application Laid-open No. 2009-239419 requires the spectroscope, the color patch, and a standard light source every time an image is captured to create a profile. Providing the spectroscope, which is expensive, to the configuration leads to an increase in costs.

In Japanese Patent Application Laid-open No. 2009-239419, an error in the color patch after the matrix transformation is displayed to enable the user to correct the profile at his or her judgment. As a result, the conversion accuracy varies between individual users.

In Japanese Patent Application Laid-open No. 2009-239419, the transformation matrix is created by the least squares method. As a result, while the overall average value reaches the minimum, a color range with a large error partially remains. Furthermore, to create the transformation matrix by the least squares method, linear algebra calculation (e.g., inverse matrix calculation) needs to be performed. As a result, the amount of calculation becomes enormous.

Therefore, there is a need for a color measuring device that is reasonable in price and that facilitates improvement in the accuracy in color measurement.

SUMMARY OF THE INVENTION

It is an object of the present invention to at least partially solve the problems in the conventional technology.

According to an embodiment, there is provided a color measuring device that includes a storage unit configured to store therein colorimetric values corresponding respectively to a plurality of colors constituting a reference chart in a predetermined color space that is device-independent; an image capturing unit configured to capture the reference chart and a subject to be a target for color measurement simultaneously to acquire RGB values of the reference chart and RGB values of the subject; a search unit configured to search for at least RGB values of four points corresponding to vertices of a polyhedron in the reference chart, the polyhedron including a specified RGB value of the subject in an RGB color space; a calculating unit configured to calculate a linear transformation matrix for converting the RGB values of the four points in the reference chart into the colorimetric values corresponding to the RGB values of the four points stored in the storage unit; and a conversion unit configured to convert the specified RGB value of the subject into a colorimetric value corresponding to the specified RGB value of the subject in the predetermined color space based on the linear transformation matrix.

According to another embodiment, there is provided an image capturing device that includes the color measuring device according to the above embodiment.

According to another embodiment, there is provided an image forming apparatus that includes the color measuring device according to the above embodiment.

According to another embodiment, there is provided a color measurement method that includes capturing a reference chart and a subject to be a target for color measurement simultaneously to acquire RGB values of the reference chart and RGB values of the subject, a plurality of colors constituting the reference chart being stored in advance as colorimetric values in a predetermined color space that is device-independent, respectively; searching for at least RGB values of four points corresponding to vertices of a polyhedron in the reference chart, the polyhedron including a specified RGB value of the subject in an RGB color space; calculating a linear transformation matrix for converting the RGB values of the four points in the reference chart into the colorimetric values corresponding to the RGB values of the four points; and converting the specified RGB value of the subject into a colorimetric value corresponding to the specified RGB value of the subject in the predetermined color space based on the linear transformation matrix.

According to still another embodiment, there is provided a computer program product comprising a non-transitory computer readable medium including programmed instructions. The instructions cause a computer to execute the color measurement method according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 illustrates a specific example of a color measurement method for the patch image;

FIGS. 12A and 12B illustrate conversion equations used for conversion between the L*a*b* value and the XYZ value;

FIG. 17 is a view for explaining a method for measuring positional deviation in an image in a main-scanning direction;

FIG. 18 is another view for explaining the method for measuring positional deviation in the image in the main-scanning direction;

DETAILED DESCRIPTION OF THE PREFERRED EMBODIMENTS

Exemplary embodiments of a color measuring device, an image capturing device, an image forming apparatus, a color measurement method, and a computer program product according to the present invention will be described below in detail with reference to the accompanying drawings. In the embodiments described below, an inkjet printer is used as an example of an image forming apparatus to which the present invention is applied. However, the present invention is widely applicable to various types of image forming apparatuses that output an image to a recording medium.

Mechanical Configuration of the Image Forming Apparatus

Figure 1:
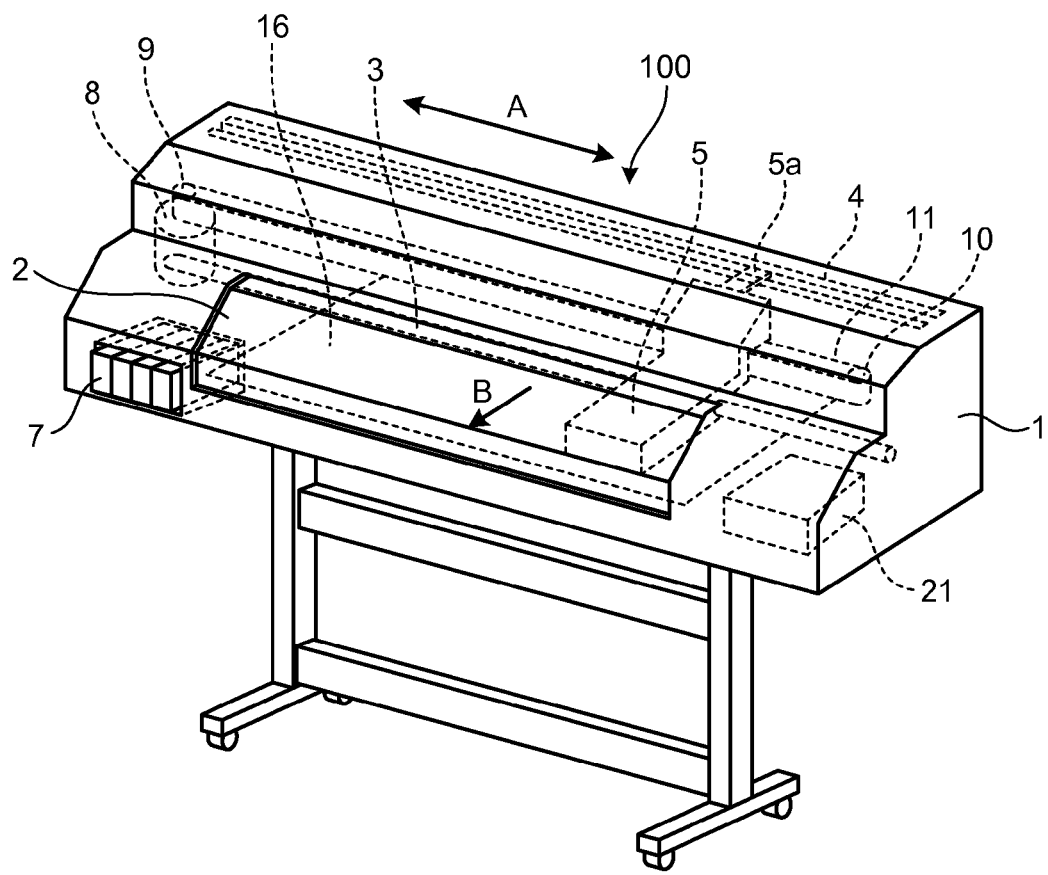
FIG. 1 is a perspective view illustrating the inside of an image forming apparatus in a see-through manner.
Figure 2:
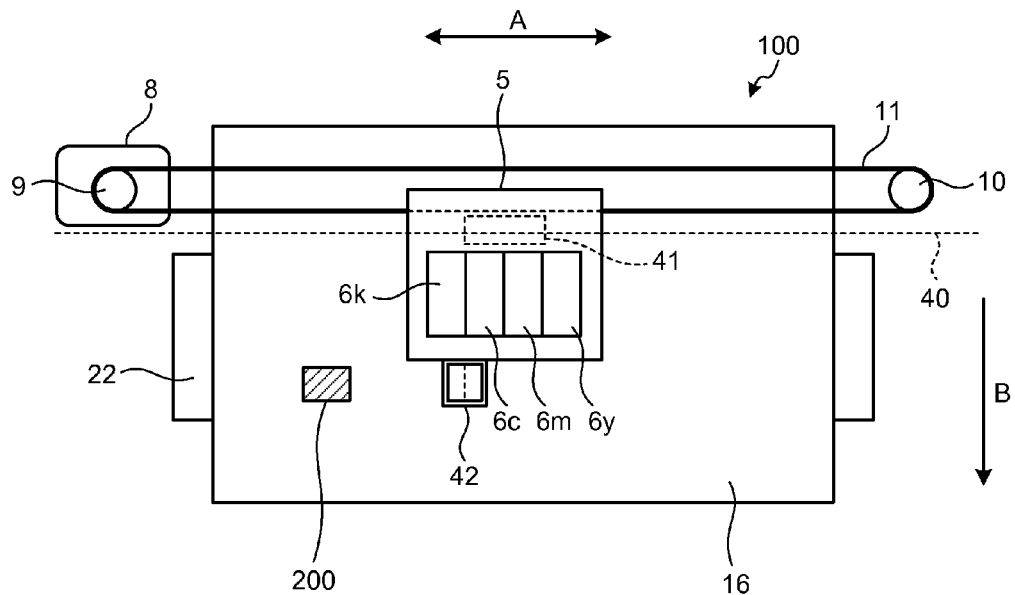
FIG. 2 is a top view of a mechanical configuration of the inside of the image forming apparatus.
Figure 3:
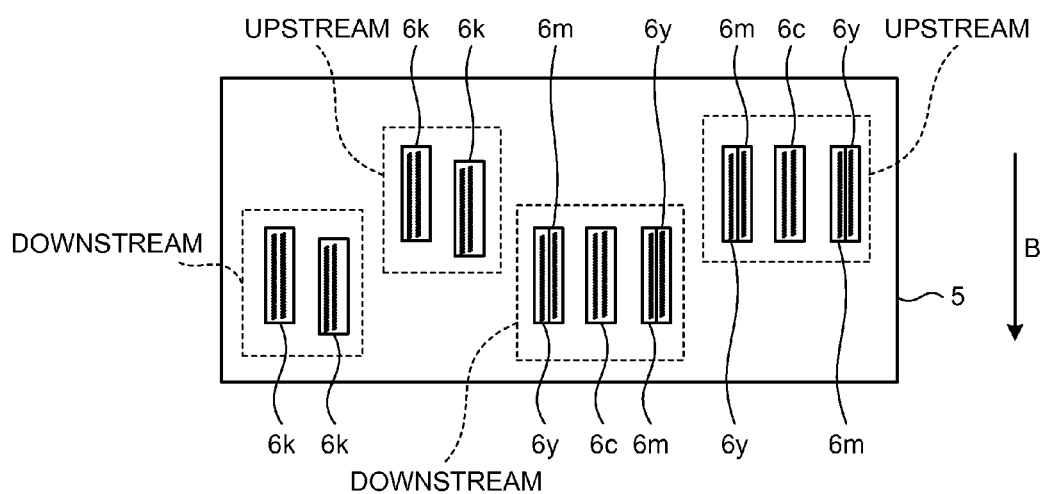
FIG. 3 is a view for explaining an exemplary arrangement of a print head mounted on a carriage.

A mechanical configuration of an image forming apparatus 100 according to the present embodiment will be described with reference to FIG. 1 to FIG. 3. FIG. 1 is a perspective view illustrating the inside of the image forming apparatus 100 according to the present embodiment in a see-through manner. FIG. 2 is a top view of the mechanical configuration of the inside of the image forming apparatus 100 according to the present embodiment. FIG. 3 is a view for explaining an exemplary arrangement of a print head 6 mounted on a carriage 5.

As illustrated in FIG. 1, the image forming apparatus 100 according to the present embodiment includes the carriage 5.

The carriage 5 reciprocates in a main-scanning direction (direction of arrow A in FIG. 1), thereby forming an image on a recording medium 16 conveyed intermittently in a sub-scanning direction (direction of arrow B in FIG. 1). The carriage 5 is supported by a main guide rod 3 extending along the main-scanning direction. The carriage is provided with a connection piece 5a. The connection piece 5a engages with a sub guide member 4 arranged in parallel with the main guide rod 3, and stabilizes the position of the carriage 5.

As illustrated in FIG. 2, the carriage 5 includes a print head 6y that ejects yellow (Y) ink, a print head 6m that ejects magenta (M) ink, a print head 6c that ejects cyan (C) ink, and a plurality of print heads 6k that eject black (Bk) ink (hereinafter, if the print heads 6y, 6m, 6c, and 6k are called collectively, the print heads are referred to as a print head 6). The print head 6 is mounted on the carriage 5 with an ejection surface (nozzle surface) facing downward (toward the recording medium 16).

A cartridge 7 is an ink supplier for supplying ink to the print head 6. The cartridge 7 is not mounted on the carriage 5, but is arranged at a predetermined position in the image forming apparatus 100. The cartridge 7 and the print head 6 are connected by a pipe, which is not illustrated, and the cartridge 7 supplies ink to the print head 6 through the pipe.

The carriage 5 is connected to a timing belt 11 stretched across a driving pulley 9 and a driven pulley 10. The driving pulley 9 rotates by drive of a main-scanning motor 8. The driven pulley 10 has a mechanism for adjusting the distance between the driving pulley 9 and the driven pulley 10, and has a function to apply predetermined tension to the timing belt 11. The drive of the main-scanning motor 8 moves the timing belt 11, thereby causing the carriage 5 to reciprocate in the main-scanning direction. As illustrated in FIG. 2, for example, the movement of the carriage 5 in the main-scanning direction is controlled based on an encoder value. The encoder value is obtained by an encoder sensor 41 provided to the carriage 5 detecting a mark of an encoder sheet 40.

The image forming apparatus 100 according to the present embodiment includes a maintenance mechanism 21 for maintaining reliability of the print head 6. The maintenance mechanism 21 performs cleaning and capping for the ejection surface of the print head 6, ejection of unnecessary ink from the print head 6, and other operations.

As illustrated in FIG. 2, a platen 22 is arranged at a position facing the ejection surface of the print head 6. The platen 22 supports the recording medium 16 when the print head 6 ejects ink on the recording medium 16. The image forming apparatus 100 according to the present embodiment is a wide apparatus in which the carriage 5 moves for a long distance in the main-scanning direction. Therefore, the platen 22 is formed of a plurality of plate members joined in the main-scanning direction (direction of movement of the carriage 5). The recording medium 16 is nipped by carriage rollers driven by a sub-scanning motor, which is not illustrated, and is conveyed intermittently in the sub-scanning direction on the platen 22.

The print head 6 includes a plurality of nozzle arrays. The print head 6 ejects ink from the nozzle arrays on the recording medium 16 conveyed on the platen 22, thereby forming an image on the recording medium 16. In the present embodiment, to ensure a large width of an image that can formed on the recording medium 16 in one scanning of the carriage 5, the print heads 6 located upstream and the print heads 6 located downstream are mounted on the carriage 5 as illustrated in FIG. 3. Furthermore, the print heads 6k that eject black ink are mounted on the carriage 5 twice as many as the print heads 6y, 6m, and 6c that eject color ink. Furthermore, the print heads 6y and 6m are arranged side by side in a manner separated from each other. This configuration is employed for keeping order of colors superimposed during the reciprocation of the carriage 5 so as not to change the order of colors between the forward movement and the backward movement. The arrangement of the print head 6 illustrated in FIG. 3 is just an example, and the arrangement of the print head 6 is not limited thereto.

The components described above constituting the image forming apparatus 100 according to the present embodiment are arranged inside of an exterior body 1. The exterior body 1 is provided with a cover member 2 in an openable and closable manner. When maintenance of the image forming apparatus 100 is being done, or when a jam occurs, the cover member 2 is opened, making it possible to perform operations on the components arranged inside of the exterior body 1.

The image forming apparatus 100 according to the present embodiment conveys the recording medium 16 intermittently in the sub-scanning direction. The image forming apparatus 100 also causes the carriage 5 to move in the main-scanning direction while the conveyance of the recording medium 16 in the sub-scanning direction is stopped. At the same time, the image forming apparatus 100 ejects ink on the recording medium 16 placed on the platen 22 from the nozzle arrays of the print head 6 mounted on the carriage 5, thereby forming an image on the recording medium 16.

In particular, to perform calibration for adjusting output characteristics of the image forming apparatus 100, the image forming apparatus 100 ejects ink on the recording medium 16 placed on the platen 22 from the nozzle arrays of the print head 6 mounted on the carriage 5. The image forming apparatus 100 forms a patch image 200 to be a target for color measurement on the recording medium 16. The patch image 200 is an image obtained by the image forming apparatus 100 outputting a patch in a reference color, and reflects the output characteristics of the image forming apparatus 100. Therefore, the image forming apparatus 100 can output an image with high reproducibility by: generating a color conversion parameter based on difference between the colorimetric value of the patch image 200 and the color specification value of the reference color corresponding thereto in the standard color space; and by outputting an image based on image data on which color conversion is performed using the color conversion parameter.

The image forming apparatus 100 according to the present embodiment includes a color measuring device for performing color measurement on the patch image 200 output to the recording medium 16. The color measuring device includes an image capturing unit (image capturing device) 42. The image capturing unit 42 determines the patch image 200 to be a target for color measurement formed on the recording medium 16 by the image forming apparatus 100 as a subject, and captures the patch image 200 and a reference chart 400, which will be described later, simultaneously. Based on image data of the patch image 200 and the reference chart 400 obtained by the image capturing of the image capturing unit 42, the color measuring device calculates the colorimetric value of the patch image 200. The color measuring device has not only the function to calculate the colorimetric value of the patch image 200, but also a function to calculate the amount of positional deviation in the image output by the image forming apparatus 100 using the image data obtained by the image capturing of the image capturing unit 42. In addition, the color measuring device has a function to calculate the dot diameter of the image output by the image forming apparatus 100 using the image data obtained by the image capturing of the image capturing unit 42.

As illustrated in FIG. 2, the image capturing unit 42 is fixed to the carriage 5, and reciprocates in the main-scanning direction integrally with the carriage 5. The image capturing unit 42 determines an image (the patch image 200 to be a target for color measurement when color measurement is performed on the patch image 200) formed on the recording medium 16 to be a subject. When moving to a position facing the subject, the image capturing unit 42 captures the subject and the reference chart 400 to be a target for comparison simultaneously. Simultaneous capturing herein means acquiring image data of one frame including the subject and the reference chart 400. In other words, even if there is a time difference in acquisition of data for each pixel, the subject and the reference chart 400 are considered to be captured simultaneously as long as image data including the subject and the reference chart 400 in one frame is acquired.

Specific Example of the Image Capturing Unit

Figure 4A:
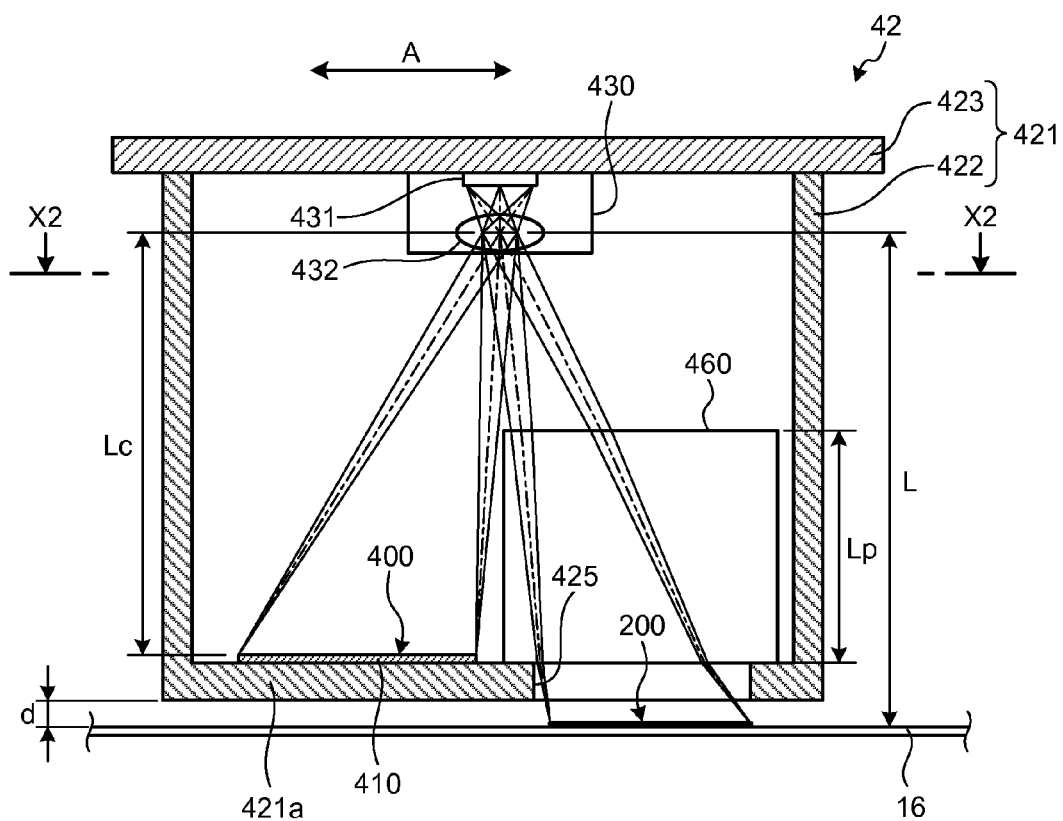
FIG. 4A is a longitudinal-sectional view (along line X1-X1 in FIG. 4B) of an image capturing unit.
Figure 4B:
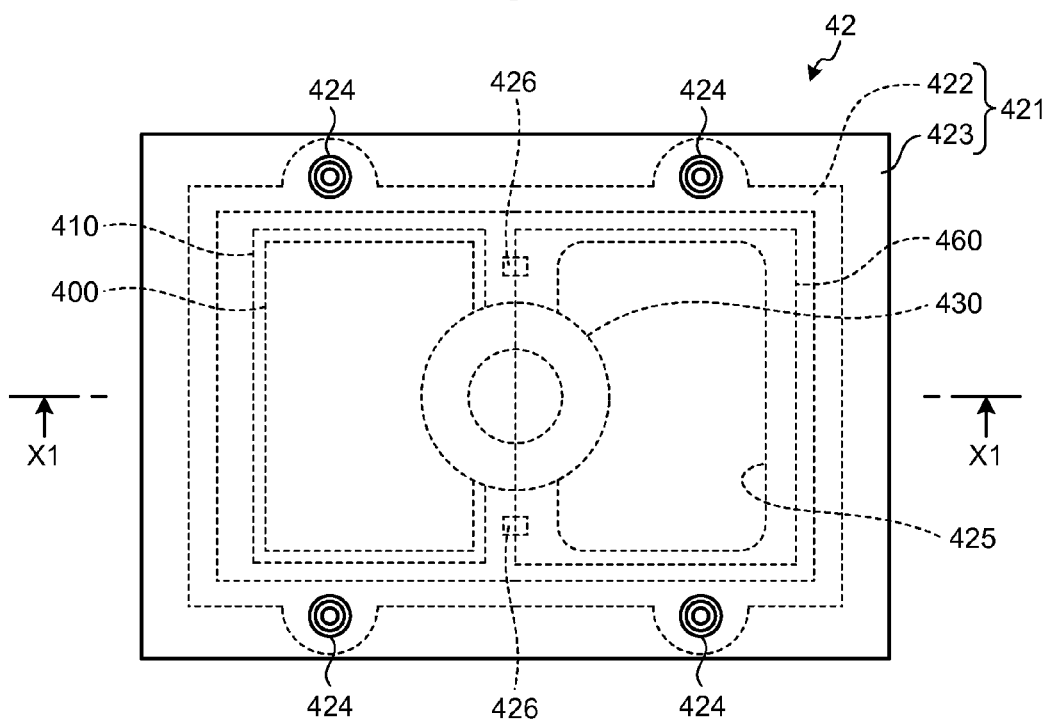
FIG. 4B is a top view illustrating the inside of the image capturing unit in a see-through manner.
Figure 4C:
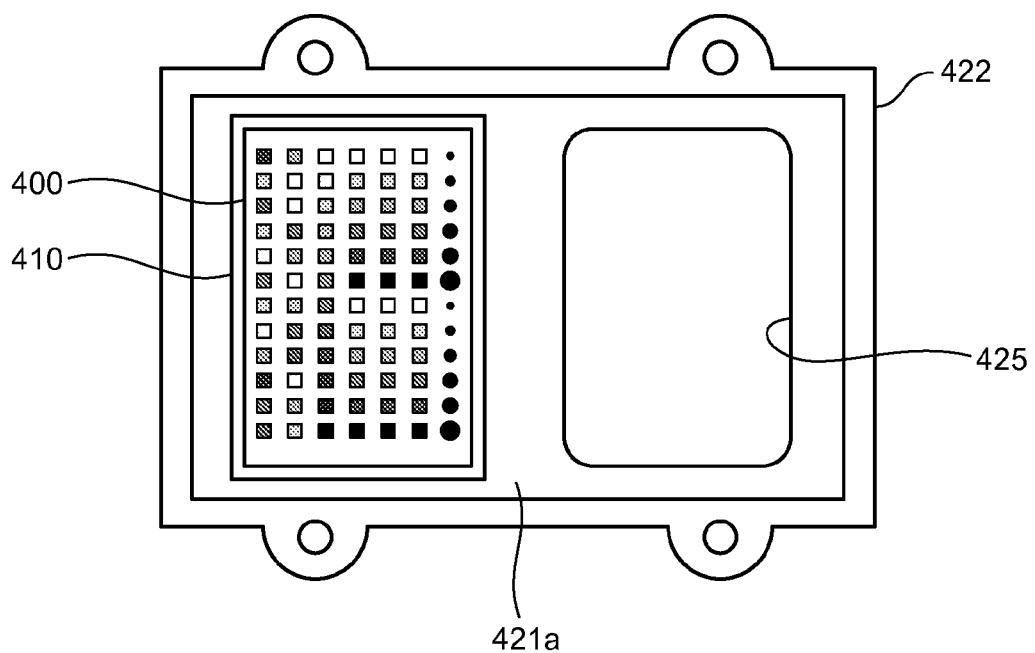
FIG. 4C is a plane view of a bottom surface of a housing viewed in X2 direction in FIG. 4A.

FIG. 4A to FIG. 4C are views of a specific example of the image capturing unit 42. FIG. 4A is a longitudinal-sectional view (along line X1-X1 in FIG. 4B) of the image capturing unit 42. FIG. 4B is a top view illustrating the inside of the image capturing unit 42 in a see-through manner. FIG. 4C is a plane view of a bottom surface of a housing viewed in X2 direction in FIG. 4A.

The image capturing unit 42 includes a housing 421 formed by combining a frame 422 and a board 423. The frame 422 is formed in a tube shape with a bottom in which one end side serving as the upper surface of the housing 421 is opened. The board 423 is fixed to the frame 422 with a fixing member 424 so as to close the open end of the frame 422 and to serve as the upper surface of the housing 421, and is integrated with the frame 422.

The housing 421 is fixed to the carriage 5 with a bottom surface 421a facing the recording medium 16 on the platen 22 with a predetermined gap d interposed therebetween. The bottom surface 421a of the housing 421 facing the recording medium 16 has an opening 425. The opening 425 allows the subject (patch image 200) formed on the recording medium 16 to be captured from the inside of the housing 421.

The housing 421 houses a sensor unit 430 that captures an image and an optical path length changing member 460. The sensor unit 430 includes a two-dimensional image sensor 431, such as a charge-coupled device (CCD) sensor and a complementary metal oxide semiconductor (CMOS) sensor, and an imaging lens 432 that focuses an optical image in an image-capturing range of the sensor unit 430 onto a sensor surface of the two-dimensional image sensor 431. The two-dimensional image sensor 431 is mounted on the inner surface (component mounting surface) of the board 423, for example, with the sensor surface facing the bottom surface 421a of the housing 421. The imaging lens 432 is fixed in a state being positioned with respect to the two-dimensional image sensor 431 so as to maintain the positional relationship specified in accordance with the optical characteristics thereof.

The optical path length changing member 460 will be described in greater detail. The image capturing unit 42 is provided with the optical path length changing member 460 in such a manner that it closes the opening 425 in the optical path between the two-dimensional image sensor 431 and the recording medium 16 through the opening 425. For the optical path length changing member 460, a transparent member having a refractive index n (n is an arbitrary value) is used. As illustrated in FIG. 4B, the optical path length changing member 460 has a larger outer shape than the size of the opening 425 and is located in the frame 422. Where to fix the optical path length changing member 460 is not limited to the position near the opening 425 inside the frame 422 as illustrated in FIG. 4B, and can be any other position in the optical path between the two-dimensional image sensor 431 and the opening 425, for example, a position on the image-capturing surface side of the frame 422 or a position away from the opening 425 inside the frame 422. As light passes through the optical path length changing member 460 having the refractive index n, the optical path of the light is extended depending on the refractive index n of the optical path length changing member 460, and the light is incident on the two-dimensional image sensor 431 with an image floating thereupon. The floating amount C of the image is determined by the following formula:

$$C = Lp(1 - 1/n)$$

where Lp denotes the length of the optical path length changing member 460.

The focal length L of the focal plane of the image capturing unit 42 other than the reference chart 400, namely, the focal length L of an image captured through the optical path length changing member 460 and the opening 425 up to the surface of the recording medium 16 is determined by the following formula:

$$L = Lc + Lp(1 - 1/n)$$

In this formula, Lc denotes the distance between the top of the imaging lens 432 on the side near the target for image capturing and the reference chart 400 and n denotes the refractive index of the optical path length changing member 460.

For example, when the refractive index n of the optical path length changing member 460 is 1.5, $L = Lc + Lp(1 - 1/1.5) = Lc + Lp(⅓)$, and the optical path can be extended by about one third of the length Lp of the optical path length changing member 460. When Lp=9 (millimeters), L=Lc+3 (millimeters). Accordingly, the image-capturing position of the reference chart 400 and the focal position of the image-capturing surface of the recording medium 16 coincide with each other, whereby the reference chart 400 and the image-capturing surface of the recording medium 16 are set in conjugated positions.

On the inner side of the bottom surface 421a of the housing 421 facing the sensor unit 430, a chart plate 410 on which the reference chart 400 is formed is arranged in a manner adjacent to the opening 425 provided to the bottom surface 421a. The chart plate 410 uses the surface opposite to the surface on which the reference chart 400 is formed as an adhesive surface, for example. The chart plate 410 is adhered to the inner surface of the bottom surface 421a of the housing 421 with an adhesive, for example, and is held in a manner fixed to the housing 421. The reference chart 400 is captured together with the subject (patch image 200) by the sensor unit 430 as a target to be compared with the subject (patch image 200). In other words, the sensor unit 430 captures the subject (patch image 200) outside of the housing 421 through the opening 425 provided to the bottom surface 421a of the housing 421. Simultaneously, the sensor unit 430 captures the reference chart 400 on the chart plate 410 arranged on the inner side of the bottom surface 421a of the housing 421 as a target to be compared with the subject (patch image 200). The reference chart 400 will be described later in greater detail.

The housing 421 also houses an illumination light source 426 that illuminates the subject (patch image 200) and the reference chart 400 when the sensor unit 430 captures the subject (patch image 200) and the reference chart 400 simultaneously. A light-emitting diode (LED) is used as the illumination light source 426, for example. In the present embodiment, two LEDs are used as the illumination light source 426. The two LEDs used as the illumination light source 426 are mounted on the inner surface of the board 423 together with the two-dimensional image sensor 431 of the sensor unit 430, for example. However, the illumination light source 426 only needs to be arranged at a position where the illumination light source 426 can illuminate the subject (patch image 200) and the reference chart 400. Therefore, the illumination light source 426 is not necessarily mounted on the board 423 directly.

In the present embodiment, as illustrated in FIG. 4B, the two LEDs used as the illumination light source 426 are arranged as follows: the projected positions of the two LEDs on the bottom surface 421a vertically viewed from the board 423 side to the bottom surface 421a side of the housing 421 are within an area between the opening 425 and the reference chart 400; and the projected positions are symmetrically arranged with respect to the sensor unit 430. In other words, a line obtained by connecting the two LEDs used as the illumination light source 426 passes through the center of the imaging lens 432 of the sensor unit 430. In addition, the opening 425 provided to the bottom surface 421a of the housing 421 and the reference chart 400 are arranged at line-symmetric positions with respect to the line obtained by connecting the two LEDs. By arranging the two LEDs used as the illumination light source 426 in this manner, it is possible to illuminate the subject (patch image 200) and the reference chart 400 under nearly the same conditions.

To illuminate the subject (patch image 200) outside of the housing 421 under the same illumination conditions as those for the reference chart 400 arranged inside of the housing 421, it is necessary to illuminate the subject (patch image 200) only with the illumination light from the illumination light source 426 while preventing the subject (patch image 200) from being irradiated with outside light when the sensor unit 430 captures the subject (patch image 200). To prevent the subject (patch image 200) from being irradiated with outside light, it is effective that the gap d between the bottom surface 421a of the housing 421 and the recording medium 16 is made small such that the housing 421 blocks outside light toward the subject (patch image 200). However, if the gap d between the bottom surface 421a of the housing 421 and the recording medium 16 is made too small, the recording medium 16 may come into contact with the bottom surface 421a of the housing 421. As a result, there is a possibility that the image fails to be captured properly. Therefore, in consideration of the planarity of the recording medium 16, it is preferable that the gap d between the bottom surface 421a of the housing 421 and the recording medium 16 be set to a small value within the range where the recording medium 16 does not come into contact with the bottom surface 421a of the housing 421. If the gap d between the bottom surface 421a of the housing 421 and the recording medium 16 is set to approximately 1 millimeter to 2 millimeters, for example, the recording medium 16 does not come into contact with the bottom surface 421a of the housing 421. In addition, it is possible to effectively prevent the subject (patch image 200) formed on the recording medium 16 from being irradiated with outside light.

To irradiate the subject (patch image 200) with the illumination light from the illumination light source 426 properly, it is preferable that the size of the opening 425 provided to the bottom surface 421a of the housing 421 be made larger than that of the subject (patch image 200). With such a configuration, no shadow generated by an edge of the opening 425 blocking the illumination light is projected on the subject (patch image 200).

Furthermore, if the gap d between the bottom surface 421a of the housing 421 and the recording medium 16 is made small, difference between the optical path length from the sensor unit 430 to the subject (patch image 200) and the optical path length from the sensor unit 430 to the reference chart 400 can fall within the depth of field of the sensor unit 430. In the image capturing unit 42 according to the present embodiment, the sensor unit 430 captures the subject (patch image 200) outside of the housing 421 and the reference chart 400 arranged inside of the housing 421 simultaneously. Therefore, if the difference between the optical path length from the sensor unit 430 to the subject (patch image 200) and the optical path length from the sensor unit 430 to the reference chart 400 exceeds the depth of field of the sensor unit 430, an image in which both the subject (patch image 200) and the reference chart 400 come into focus fails to be captured.

The difference between the optical path length from the sensor unit 430 to the subject (patch image 200) and the optical path length from the sensor unit 430 to the reference chart 400 is approximately a value obtained by adding the gap d to the thickness of the bottom surface 421a of the housing 421. Therefore, if the gap d is set to a value small enough, the difference between the optical path length from the sensor unit 430 to the subject (patch image 200) and the optical path length from the sensor unit 430 to the reference chart 400 can fall within the depth of field of the sensor unit 430. As a result, it is possible to capture an image in which both the subject (patch image 200) and the reference chart 400 come into focus. If the gap d is set to approximately 1 millimeter to 2 millimeters, for example, the difference between the optical path length from the sensor unit 430 to the subject (patch image 200) and the optical path length from the sensor unit 430 to the reference chart 400 can fall within the depth of field of the sensor unit 430.

The depth of field of the sensor unit 430 is a characteristic unique to the sensor unit 430. The depth of field of the sensor unit 430 is determined based on the aperture value of the sensor unit 430, the focal length of the imaging lens 432, the distance between the sensor unit 430 and the subject, and other factors. In the image capturing unit 42 according to the present embodiment, the sensor unit 430 is designed as follows. The difference between the optical path length from the sensor unit 430 to the subject (patch image 200) and the optical path length from the sensor unit 430 to the reference chart 400 falls within the depth of field if the gap d between the bottom surface 421a of the housing 421 and the recording medium 16 is set to a value small enough of approximately 1 millimeter to 2 millimeters, for example.

Figure 4D:
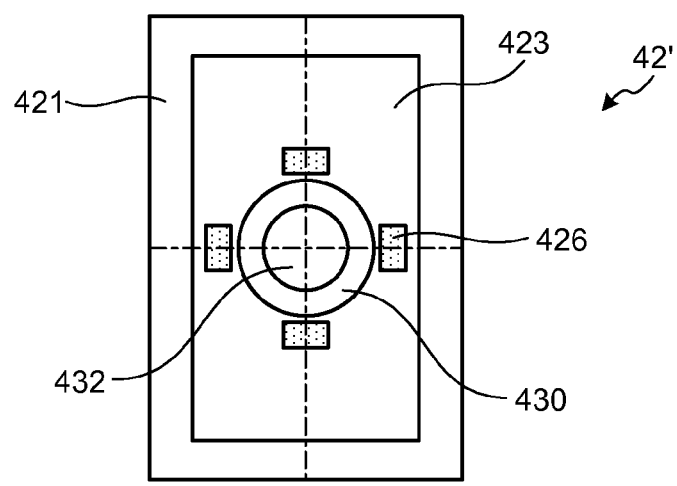
FIG. 4D is a view for explaining an exemplary configuration of another illumination system of the image capturing unit.

The illumination system of the image capturing unit 42 may have a configuration of an image capturing unit 42' illustrated in FIG. 4D. As illustrated in FIG. 4D, in the image capturing unit 42', four illumination light sources 426 are arranged around the imaging lens 432.

Specific Example of the Reference Chart

Figure 5:
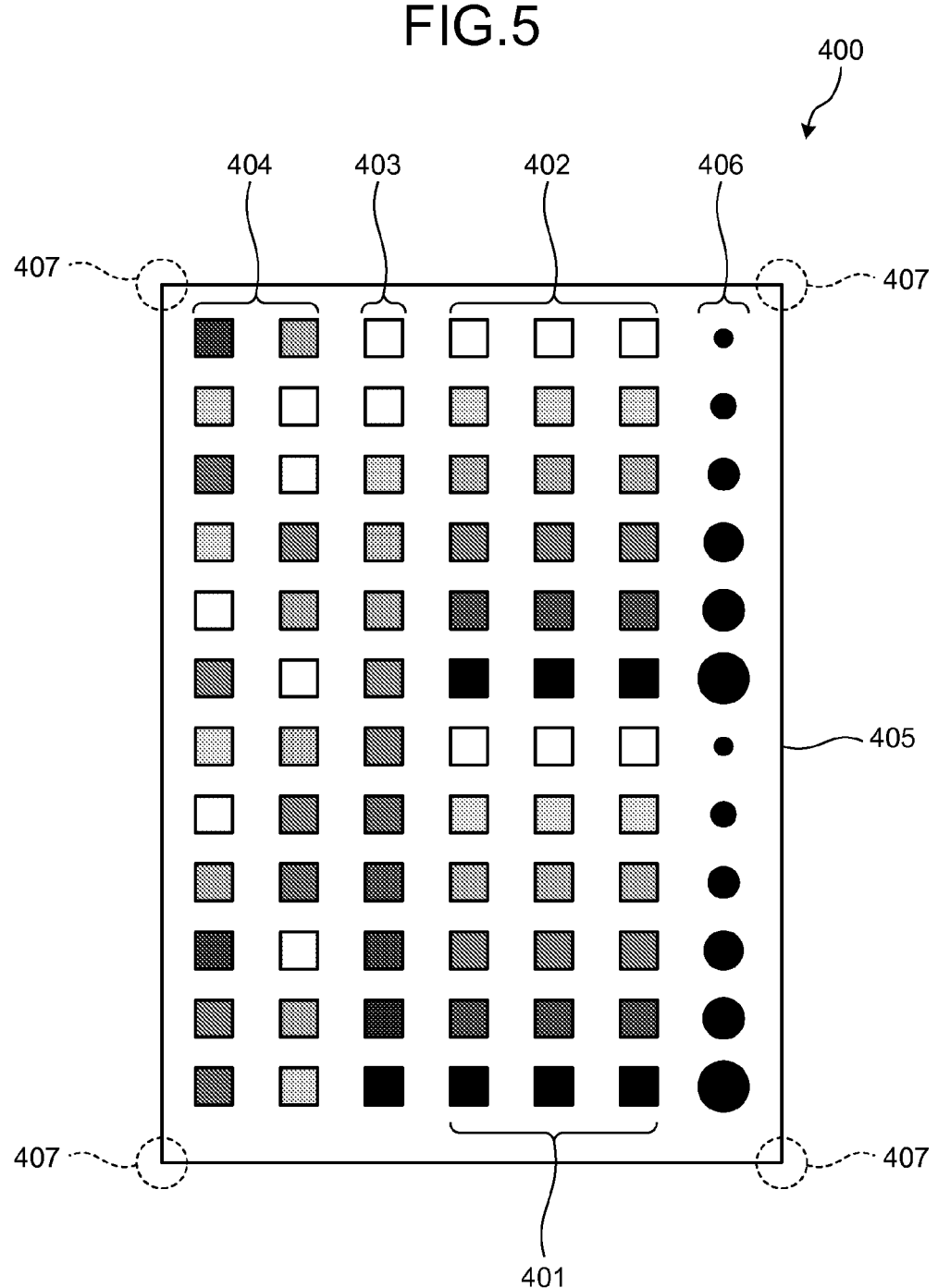
FIG. 5 is a view of a specific example of a reference chart.

The reference chart 400 on the chart plate 410 arranged inside of the housing 421 of the image capturing unit 42 will now be described in greater detail with reference to FIG. 5. FIG. 5 is a view of a specific example of the reference chart 400.

The reference chart 400 illustrated in FIG. 5 includes color measurement patch arrays 401 to 404 in which patches for color measurement are arranged, a pattern array 406 in which dot diameter measurement patterns are arranged, and a distance measurement pattern 405.

The color measurement patch arrays include the patch array 401 in which patches in primary colors of YMC are arranged in order of scale, the patch array 402 in which patches in secondary colors of RGB are arranged in order of scale, the patch array (achromatic scale patterns) 403 in which patches of a gray scale are arranged in order of scale, and the patch array 404 in which patches in tertiary colors are arranged.

The dot diameter measurement pattern array 406 is a pattern array in which circular patterns in different sizes are arranged in order of size.

The distance measurement pattern 405 is formed as a rectangular frame surrounding the color measurement patch arrays 401 to 404 and the dot diameter measurement pattern array 406. Four corners 407 of the distance measurement pattern 405 are markers for specifying the position of the reference chart 400. A host central processing unit (CPU) 107, which will be described later, specifies the four corners 407 of the distance measurement pattern 405 from the image data of the reference chart 400 acquired from the image capturing unit 42, thereby specifying the position of the reference chart 400.

The color specification values (L*a*b* values) of the patches constituting the color measurement patch arrays 401 to 404 in the L*a*b* color space serving as the standard color space are measured in advance. The color specification values are used as reference values when color measurement is performed on the patch image 200. The configuration of the color measurement patch arrays 401 to 404 arranged in the reference chart 400 is not limited to the example illustrated in FIG. 5. Alternatively, arbitrary patch arrays can be applied thereto. For example, patches capable of specifying the color range as wide as possible can be used. The patch array 401 in the primary colors of YMCK and the patch array 403 of the gray scale can be formed of patches having the colorimetric values of the ink used for the image forming apparatus 100. Furthermore, the patch array 402 in the secondary colors of RGB can be formed of patches having the colorimetric values capable of being produced by the ink used in the image forming apparatus 100. Alternatively, a standard color chart that specifies colorimetric values, such as Japan Color, can be used.

Schematic Configuration of Control mechanism of the Image Forming Apparatus

Figure 6:
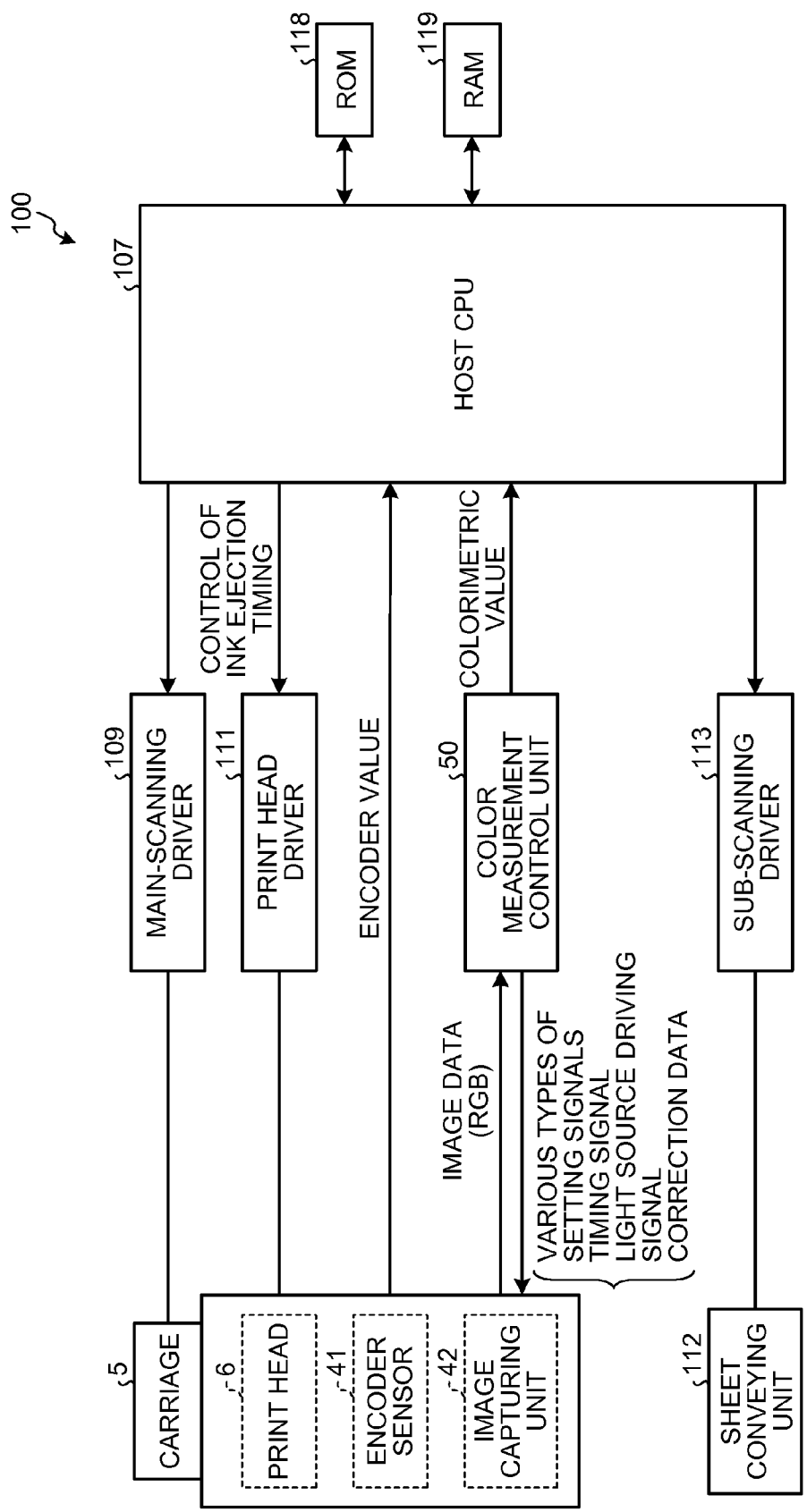
FIG. 6 is a block diagram of a schematic configuration of a control mechanism of the image forming apparatus.

A schematic configuration of a control mechanism of the image forming apparatus 100 according to the present embodiment will now be described with reference to FIG. 6. FIG. 6 is a block diagram of the schematic configuration of the control mechanism of the image forming apparatus 100.

The control mechanism of the image forming apparatus 100 according to the present embodiment includes the host CPU 107, a read-only memory (ROM) 118, a random accesses memory (RAM) 119, a main-scanning driver 109, a print head driver 111, a color measurement control unit 50, a sheet conveying unit 112, a sub-scanning driver 113, the print head 6, the encoder sensor 41, and the image capturing unit 42. The print head 6, the encoder sensor 41, and the image capturing unit 42 are mounted on the carriage 5 as described above.

The host CPU 107 supplies data of an image to be formed on the recording medium 16 and a drive control signal (pulse signal) to each driver, and controls the whole of the image forming apparatus 100. Specifically, the host CPU 107 controls drive of the carriage 5 in the main-scanning direction via the main-scanning driver 109. The host CPU 107 controls the ink ejection timing of the print head 6 via the print head driver 111. The host CPU 107 controls drive of the sheet conveying unit 112 including the carriage rollers and the sub-scanning motor via the sub-scanning driver 113.

The encoder sensor 41 outputs an encoder value obtained by detecting a mark of the encoder sheet 40 to the host CPU 107. Based on the encoder value from the encoder sensor 41, the host CPU 107 controls drive of the carriage 5 in the main-scanning direction via the main-scanning driver 109.

As described above, the image capturing unit 42 causes the sensor unit 430 to capture the patch image 200 and the reference chart 400 on the chart plate 410 arranged inside of the housing 421 simultaneously when color measurement is performed on the patch image 200 formed on the recording medium 16. The image capturing unit 42 then outputs the image data including the patch image 200 and the reference chart 400 to the color measurement control unit 50.

Based on the image data of the patch image 200 and the reference chart 400 acquired from the image capturing unit 42, the color measurement control unit 50 calculates the colorimetric value (color specification value in the standard color space) of the patch image 200. The colorimetric value of the patch image 200 calculated by the color measurement control unit 50 is transmitted to the host CPU 107. The color measurement control unit 50 and the image capturing unit 42 constitute the color measuring device.

The color measurement control unit 50 supplies various types of setting signals, a timing signal, a light source driving signal, and the like to the image capturing unit 42, and controls image capturing performed by the image capturing unit 42. The various types of setting signals include a signal for setting an operation mode of the sensor unit 430, and a signal for setting image-capturing conditions, such as the shutter speed and gain in automatic gain control (AGC). The color measurement control unit 50 acquires these setting signals from the host CPU 107, and supplies the signals to the image capturing unit 42. The timing signal is a signal for controlling the operational timing of image capturing performed by the sensor unit 430. The light source driving signal is a signal for controlling drive of the illumination light source 426 that illuminates the image-capturing range of the sensor unit 430. The color measurement control unit 50 generates the timing signal and the light source driving signal, and supplies the signals to the image capturing unit 42.

The ROM 118 stores therein a computer program of an operating process executed by the host CPU 107 and various types of control data, for example. The RAM 119 is used as a working memory for the host CPU 107.

Configuration of the Control Mechanism of the Color Measuring Device

Figure 7:
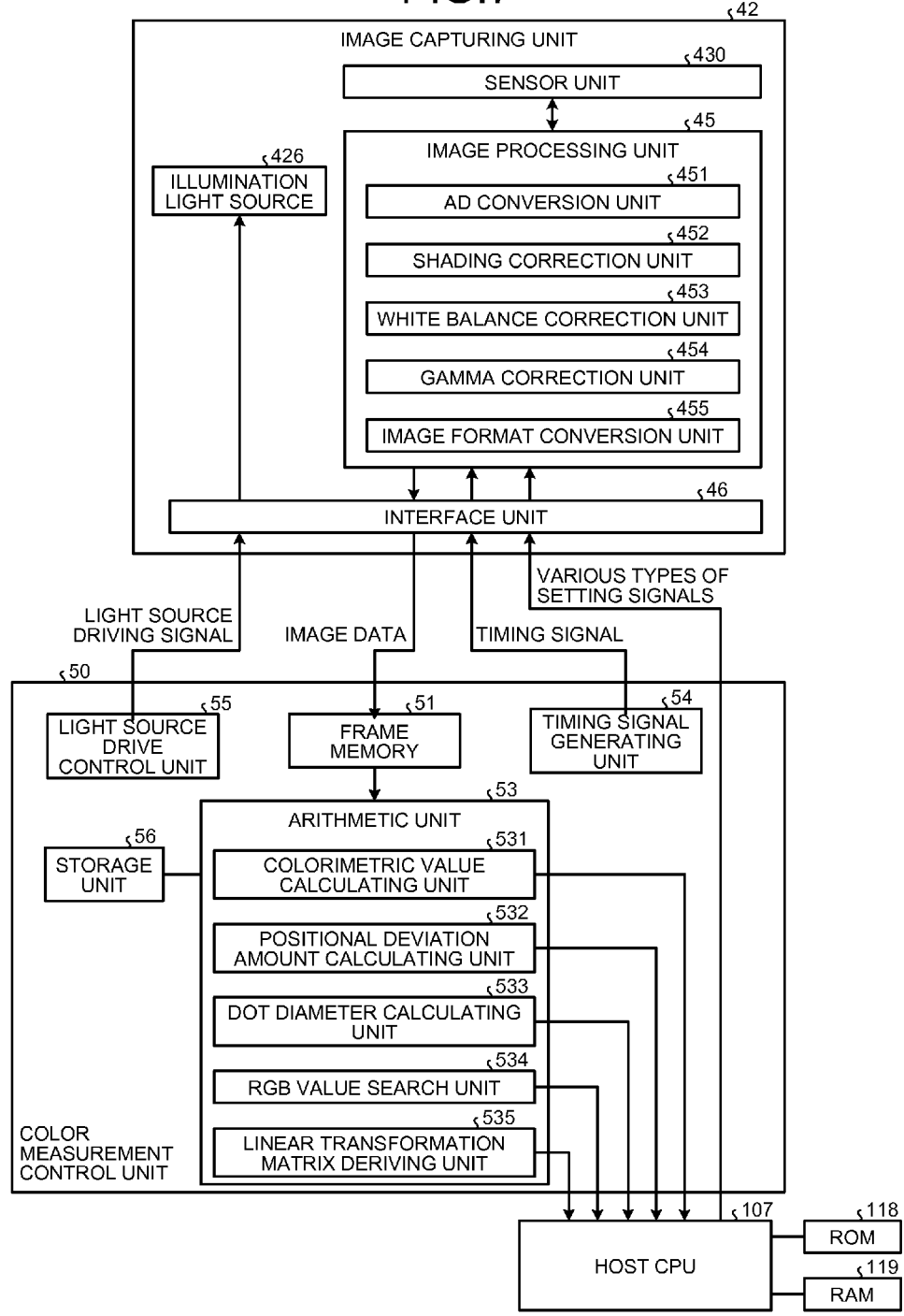
FIG. 7 is a block diagram of an exemplary configuration of a control mechanism of a color measuring device.

A control mechanism of the color measuring device will now be specifically described with reference to FIG. 7. FIG. 7 is a block diagram of an exemplary configuration of the control mechanism of the color measuring device.

The color measuring device includes the image capturing unit 42 and the color measurement control unit 50. The image capturing unit 42 includes an image processing unit 45 and an interface unit 46 in addition to the sensor unit 430 and the illumination light source 426.

The image processing unit 45 processes image data captured by the sensor unit 430. The image processing unit 45 includes an analog to digital (AD) conversion unit 451, a shading correction unit 452, a white balance correction unit 453, a gamma correction unit 454, and an image format conversion unit 455.

The AD conversion unit 451 converts an analog signal output by the sensor unit 430 into a digital signal.

The shading correction unit 452 corrects an error in the image data caused by unevenness in the illumination provided by the illumination light source 426 to the image-capturing range of the sensor unit 430.

The white balance correction unit 453 corrects the white balance of the image data.

The gamma correction unit 454 corrects the image data so as to compensate for the linearity in the sensitivity of the sensor unit 430.

The image format conversion unit 455 converts the image data into an arbitrary format.

The interface unit 46 is an interface by which the image capturing unit 42 acquires the various types of setting signals, the timing signal, and the light source driving signal supplied from the color measurement control unit 50, and by which the image capturing unit 42 transmits the image data to the color measurement control unit 50.

The color measurement control unit 50 includes a frame memory 51, an arithmetic unit 53, a timing signal generating unit 54, a light source drive control unit 55, and a storage unit 56.

The frame memory 51 temporarily stores therein the image data transmitted from the image capturing unit 42. The storage unit 56 stores therein a plurality of colors constituting the reference chart as colorimetric values in a predetermined device-independent color space.

The arithmetic unit 53 includes a colorimetric value calculating unit 531, a positional deviation amount calculating unit 532, a dot diameter calculating unit 533, an RGB value search unit 534, and a linear transformation matrix calculating unit 535.

When the sensor unit 430 of the image capturing unit 42 captures the patch image 200 to be a target for color measurement and the reference chart 400 simultaneously, the colorimetric value calculating unit 531 calculates the colorimetric value of the patch image 200 based on the image data of the patch image 200 and the reference chart 400 obtained by the image capturing. The colorimetric value of the patch image 200 calculated by the colorimetric value calculating unit 531 is transmitted to the host CPU 107. Furthermore, the colorimetric value calculating unit 531 converts the RGB value of the subject into a colorimetric value corresponding to the RGB value of the subject in the predetermined color space based on the linear transformation matrix. A specific example of the processing performed by the colorimetric value calculating unit 531 will be described later in detail.

When the image forming apparatus 100 outputs a predetermined image for measuring positional deviation to the recording medium 16, and when the sensor unit 430 of the image capturing unit 42 captures the reference chart 400 arranged inside of the housing 421 and the image for measuring positional deviation output by the image forming apparatus 100 simultaneously, the positional deviation amount calculating unit 532 calculates the amount of positional deviation in the image output by the image forming apparatus 100 based on the image data of the image for measuring positional deviation and the image data of the reference chart 400 obtained by the image capturing. The amount of positional deviation in the image calculated by the positional deviation amount calculating unit 532 is transmitted to the host CPU 107. A specific example of the processing performed by the positional deviation amount calculating unit 532 will be described later in detail.

When the image forming apparatus 100 outputs a predetermined image for measuring the dot diameter to the recording medium 16, and when the sensor unit 430 of the image capturing unit 42 captures the reference chart 400 arranged inside of the housing 421 and the image for measuring the dot diameter output by the image forming apparatus 100 simultaneously, the dot diameter calculating unit 533 calculates the dot diameter of the image output by the image forming apparatus 100 based on the image data of the image for measuring the dot diameter and the image data of the reference chart 400 obtained by the image capturing. The dot diameter of the image calculated by the dot diameter calculating unit 533 is transmitted to the host CPU 107. A specific example of the processing performed by the dot diameter calculating unit 533 will be described later in detail.

The RGB value search unit 534 searches for the RGB values of at least four points in the reference chart 400 constituting vertices of a polyhedron including the RGB value of the subject in the RGB color space.

The linear transformation matrix calculating unit 535 calculates a linear transformation matrix that converts the RGB values of the four points in the reference chart 400 into the colorimetric values corresponding thereto stored in the storage unit 56. The reference chart 400 includes a monochrome gray scale. Therefore, the linear transformation matrix calculating unit 535 corrects the RGB value of the reference chart 400 such that the actual RGB value of the gray scale obtained by the image capturing of the image capturing unit 42 is the ideal RGB value of the gray scale.

The timing signal generating unit 54 generates a timing signal that controls an operational timing of image capturing performed by the sensor unit 430 of the image capturing unit 42, and supplies the timing signal to the image capturing unit 42.

The light source drive control unit 55 generates a light source driving signal for driving the illumination light source 426 of the image capturing unit 42, and supplies the light source driving signal to the image capturing unit 42.

Color Measurement Method for the Patch Image

Figure 8:
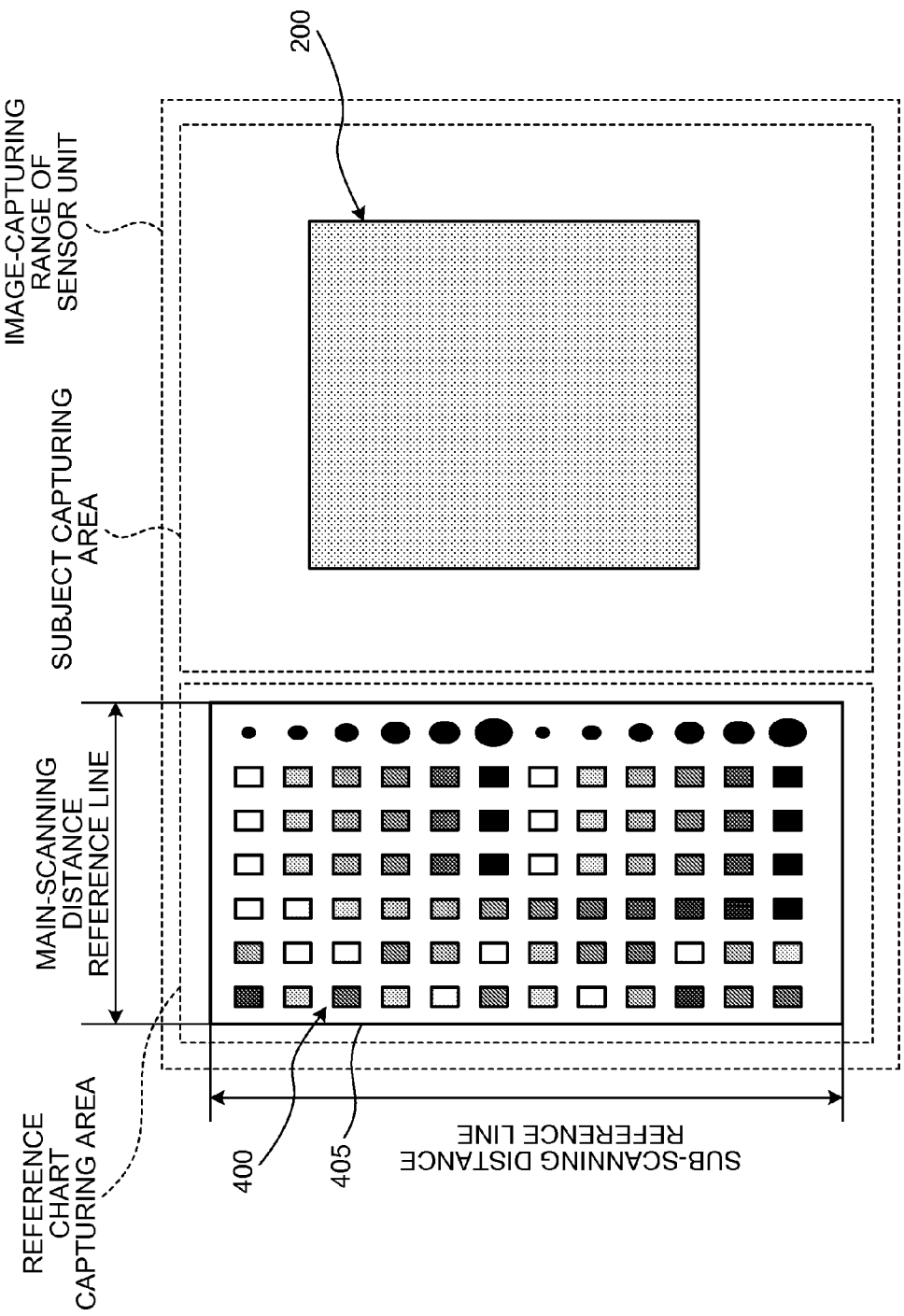
FIG. 8 is a view of an example of image data obtained by a sensor unit capturing a patch image to be a target for color measurement and the reference chart simultaneously.

A specific example of the color measurement method for the patch image 200 using the color measuring device will now be described in greater detail with reference to FIG. 8 to FIG. 13. FIG. 8 is a view of an example of the image data obtained by the sensor unit 430 capturing the patch image 200 to be a target for color measurement and the reference chart 400 simultaneously.

To perform color measurement on the patch image 200, the image forming apparatus 100 outputs an arbitrary patch to the recording medium 16 to form the patch image 200. Subsequently, the sensor unit 430 included in the image capturing unit 42 of the color measuring device captures the patch image 200 to be a target for color measurement and the reference chart 400 on the chart plate 410 arranged inside of the housing 421 of the image capturing unit 42 simultaneously. As a result, the image data including the patch image 200 and the reference chart 400 illustrated in FIG. 8 is obtained, for example. The image-capturing range of the sensor unit 430 has a reference chart capturing area in which the reference chart 400 is captured and a subject capturing area in which the patch image 200 serving as the subject for color measurement is captured. The image data output from the pixels corresponding to the reference chart capturing area is the image data of the reference chart 400. By contrast, the image data output from the pixels corresponding to the subject capturing area is the image data of the patch image 200. In the present embodiment, one patch image 200 alone is captured as the subject for color measurement. Alternatively, a plurality of patch images 200 may be captured simultaneously.

The image data of the patch image 200 and the reference chart 400 captured by the sensor unit 430 is processed by the image processing unit 45. Subsequently, the image data is transmitted from the image capturing unit 42 to the color measurement control unit 50 via the interface unit 46, and is stored in the frame memory 51 of the color measurement control unit 50. The colorimetric value calculating unit 531 of the arithmetic unit 53 then reads the image data stored in the frame memory 51, and performs color measurement on the patch image 200.

By performing pattern matching or the like, the colorimetric value calculating unit 531 specifies the positions of the four corners 407 of the distance measurement pattern (main-scanning and sub-scanning distance reference lines) 405 in the reference chart 400 based on the image data read from the frame memory 51. As a result, it is possible to specify the position of the reference chart 400 in the image data. After specifying the position of the reference chart 400, the colorimetric value calculating unit 531 specifies the position of each patch in the reference chart 400.

Figure 9:
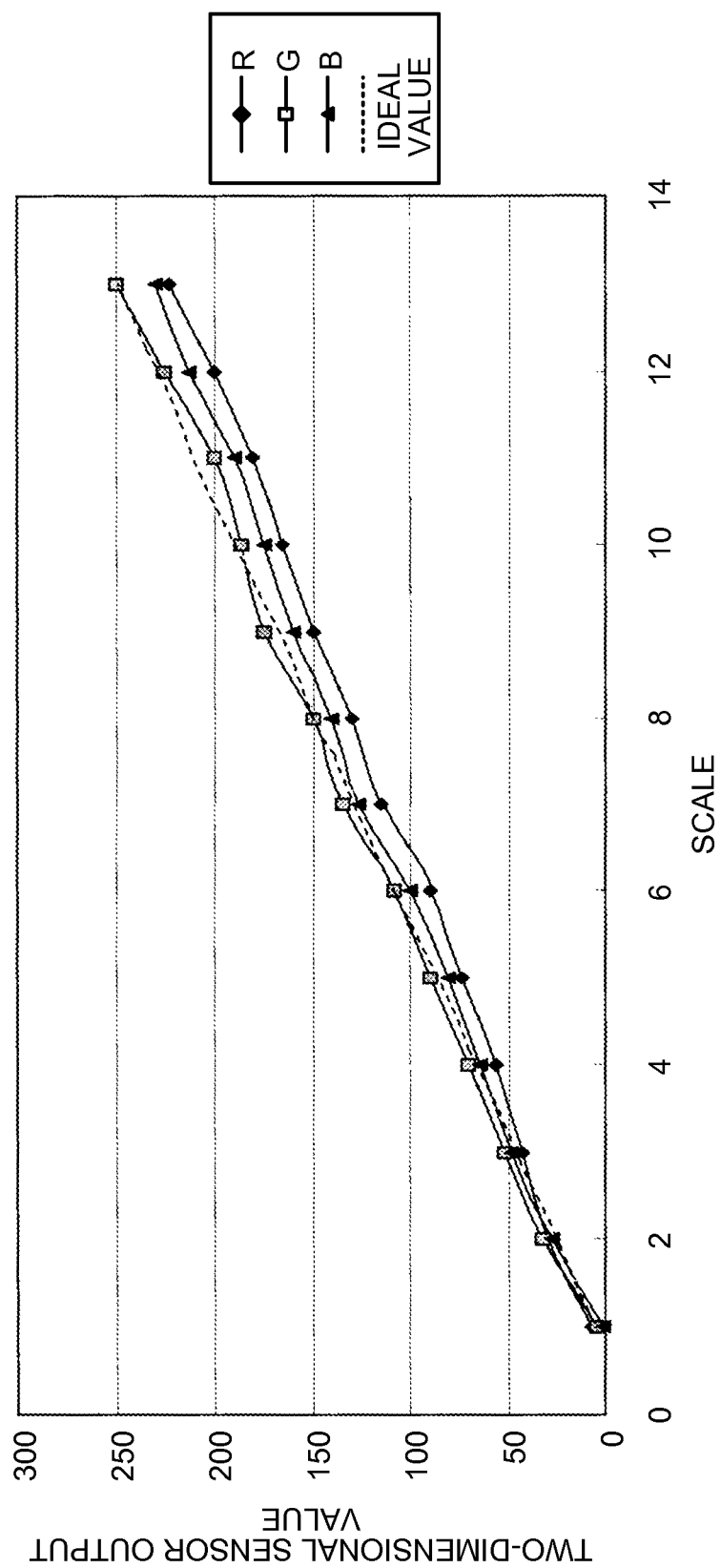
FIG. 9 is a view illustrating RGB output values before adjustment of gray balance and white balance and an ideal RGB output value.
Figure 10:
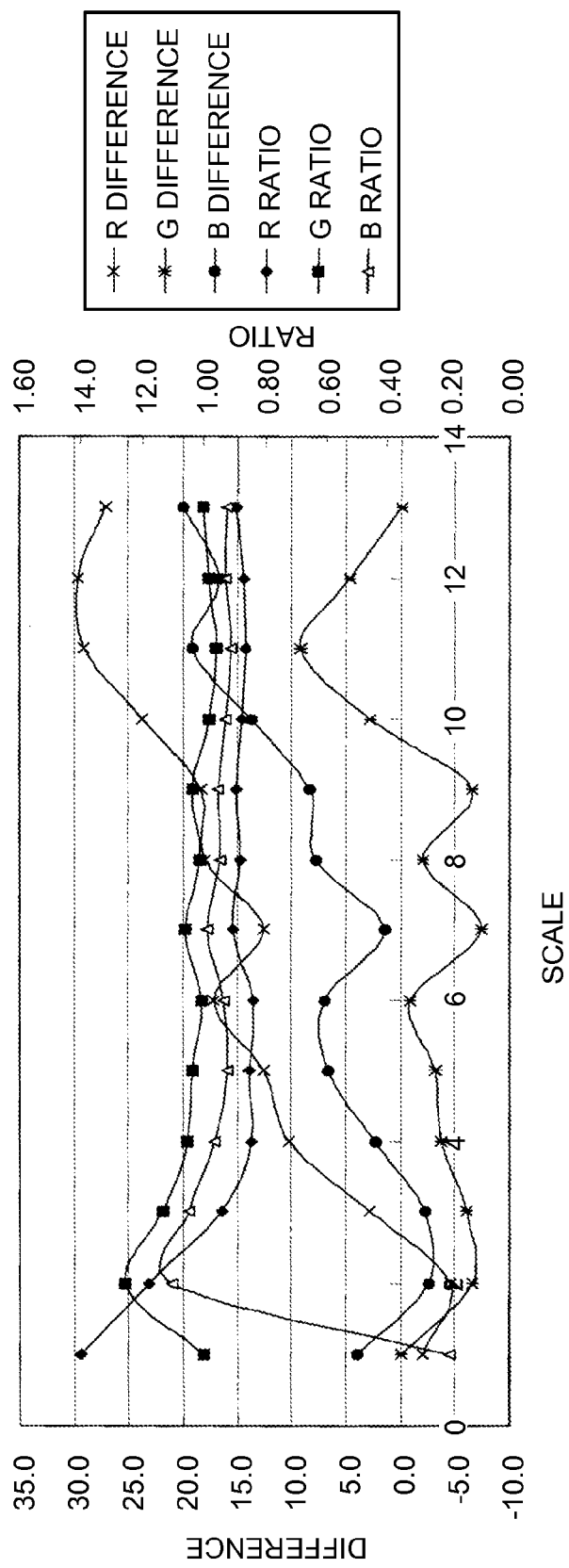
FIG. 10 is a view illustrating difference between the actual RGB output values and the ideal RGB output value, and ratio between the actual RGB output values and the ideal RGB output value.

The RGB output may be performed as follows. FIG. 9 illustrates the RGB output values before adjustment of gray balance and white balance. If no balance adjustment is performed, and the RGB value obtained from the captured image illustrated in FIG. 8 is output without any change, the RGB output values illustrated in FIG. 9 are obtained. As a result, the balance between the colors fails to be adjusted, and the colors are output as colors with saturation. This is because the RGB value has an error due to fluctuation in sensitivity of the two-dimensional image sensor 431. Ideally, all the RGB output values are output as values having the linearity indicated by the dotted line in FIG. 9. Therefore, the recording device according to the present embodiment calculates the difference between the actual RGB output values (solid lines) obtained from the captured image illustrated in FIG. 8 and the ideal RGB output value (dotted line), or the ratio between the actual RGB output values and the ideal RGB output value. Subsequently, the recording device temporarily stores the difference or the ratio thus calculated in the storage unit 56 (refer to FIG. 7). FIG. 10 illustrates an example of the difference between the actual RGB output values (solid lines) and the ideal RGB output value (dotted line), and an example of the ratio between the actual RGB output values and the ideal RGB output value. The color measuring device according to the present embodiment uses the difference or the ratio as shown in FIG. 10 stored in the storage unit 56 (refer to FIG. 7), thereby correcting the actual RGB output values. Thus, it is possible to obtain the RGB output value having the linearity.

Furthermore, it is preferable that proper interpolation processing, such as spline interpolation and polynomial interpolation, be performed on the actual RGB output values illustrated in FIG. 9. Subsequently, the difference or the ratio between the RGB output value obtained by performing the interpolation processing on the actual RGB output values in FIG. 9 and the ideal RGB output value is calculated. The difference or the ratio thus calculated is stored in the storage unit 56 (refer to FIG. 7). By using the difference or the ratio stored in the storage unit 56 (refer to FIG. 7), the actual RGB output values are corrected. Thus, it is possible to obtain the RGB output value having more excellent linearity.

Subsequently, the colorimetric value calculating unit 531 uses the image data (RGB value) of each patch in the reference chart 400, thereby converting the image data (RGB value) of the patch image 200 to be a target for color measurement into the L*a*b* value serving as the color specification value in the L*a*b* color space. A specific method for the conversion will now be described in greater detail.

FIG. 11 illustrates a specific example of a color measurement method for the patch image. In FIG. 11, (c) illustrates the state achieved by plotting the L*a*b* value of each patch of the patch array 401 in the primary color (YMC) and the patch array 402 in the secondary color (RGB) in the reference chart 400 illustrated in FIG. 5 on the L*a*b* color space. The L*a*b* value of each patch is calculated in advance as described above, and is stored in the storage unit 56 in the arithmetic unit 53, for example.

In FIG. 11, (a) illustrates the state achieved by plotting the RGB value (image data obtained by image capturing of the sensor unit 430) of each patch of the patch array 401 in the primary color (YMC) and the patch array 402 in the secondary color (RGB) in the reference chart 400 illustrated in FIG. 5 on the RGB color space.

In FIG. 11, (b) illustrates the state achieved by converting the L*a*b* value illustrated in (c) of FIG. 11 into the XYZ value using a predetermined conversion equation, and by plotting the XYZ value thus converted on the XYZ color space. The L*a*b* value can be converted into the XYZ value by using the conversion equation illustrated in FIG. 12B (from Lab to XYZ). By contrast, the XYZ value can be converted into the L*a*b* value by using the conversion equation illustrated in FIG. 12A (from XYZ to Lab). In other words, the L*a*b* value illustrated in (c) of FIG. 11 and the XYZ value illustrated in (b) of FIG. 11 can be interconverted by using the conversion equations illustrated in FIGS. 12A and 12B.

Figure 13:
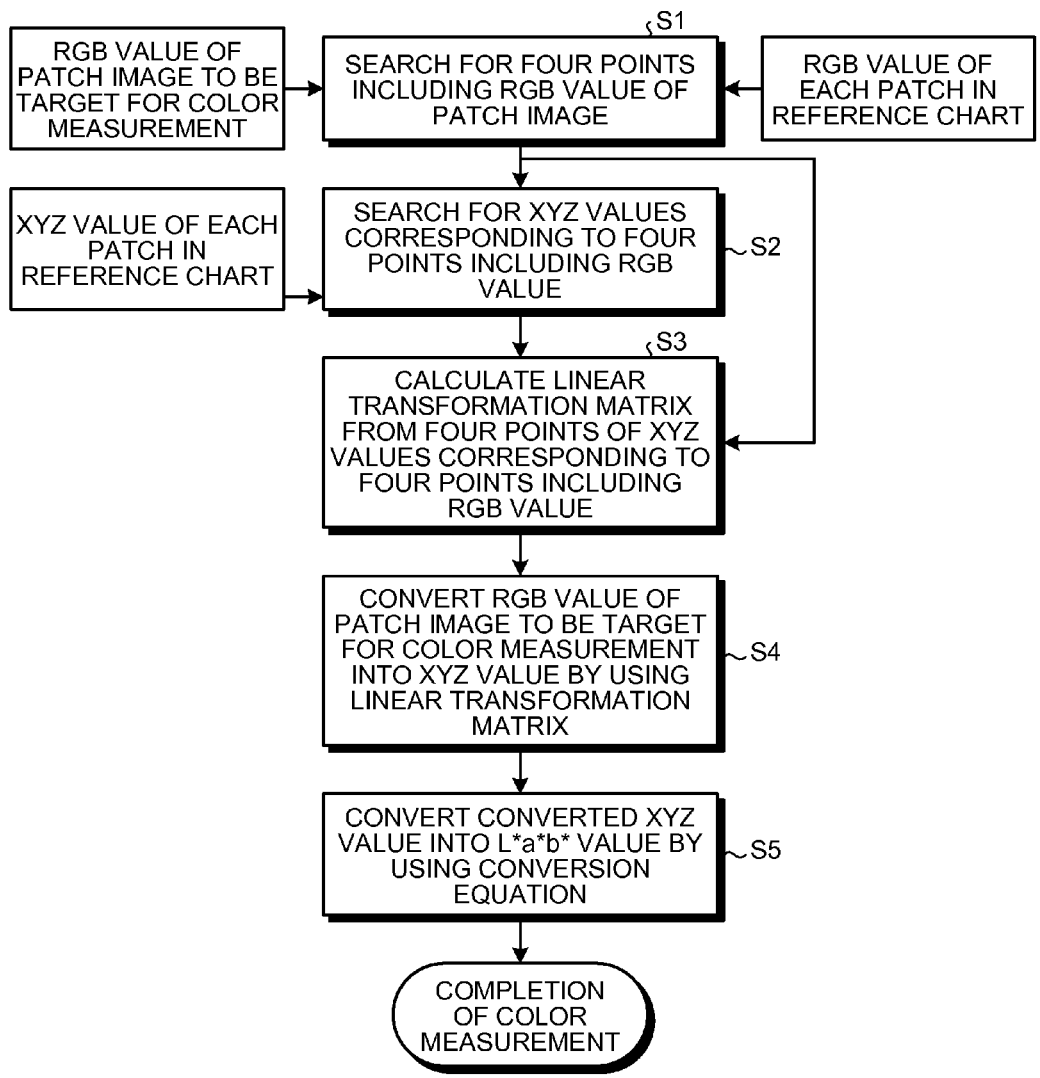
FIG. 13 is a flowchart illustrating a process of color measurement of the patch image.

An explanation will be made of the process for converting the RGB value of the patch image 200 to be a target for color measurement obtained from the subject capturing area illustrated in FIG. 8 into the L*a*b* value with reference to the flowchart of FIG. 13. An assumption is made that the RGB value of the patch image 200 to be a target for color measurement is present on $P_{rgb}$ in the RGB color space illustrated in (a) of FIG. 11. In this case, the RGB value search unit 534 searches for four points in the nearest neighborhood capable of forming a tetrahedron including $P_{rgb}$ among the RGB values of the patches in the reference chart 400 illustrated in FIG. 8 (Step S1). In the example of (a) of FIG. 11, four points of $p_0$, $p_1$, $p_2$, and $p_3$ are selected. The coordinates of the four points of $p_0$, $p_1$, $p_2$, and $p_3$ in the RGB color space illustrated in (a) of FIG. 11 are represented by $p_0(x_{01}, x_{02}, x_{03})$, $p_1(x_1, x_2, x_3)$, $p_2(x_4, x_5, x_6)$, and $p_3(x_7, x_8, x_9)$, respectively.

The RGB value search unit 534 then searches for four points of $q_0$, $q_1$, $q_2$, and $q_3$ in the XYZ color space illustrated in (b) of FIG. 11 corresponding to the four points of $p_0$, $p_1$, $p_2$, and $p_3$ in the RGB color space illustrated in (a) of FIG. 11, respectively (Step S2). The coordinates of the four points of $q_0$, $q_1$, $q_2$, and $q_3$ in the XYZ color space are represented by $q_0(y_{01}, y_{02}, y_{03})$, $q_1(y_1, y_2, y_3)$, $q_2(y_4, y_5, y_6)$, and $q_3(y_7, y_8, y_9)$, respectively.

Subsequently, the linear transformation matrix calculating unit 535 calculates a linear transformation matrix for linearly transforms the local space in the tetrahedron (Step S3). Specifically, the linear transformation matrix calculating unit 535 selects an arbitrary pair of corresponding points ($p_0$ and $q_0$ closest to an achromatic color in the present embodiment) among the four points of $p_0$, $p_1$, $p_2$, and $p_3$ in the RGB color space, and determines the corresponding points ($p_0$, $q_0$) to be the origin (the coordinate values of $p_1$ to $p_3$ and $q_1$ to $q_3$ are represented by relative values with respect to $p_0$, $q_0$).

If it is assumed that the conversion equation between the RGB color space illustrated in (a) of FIG. 11 and the XYZ color space illustrated in (b) of FIG. 11 can be linearly transformed into Y=AX, the equation is represented by Equation (1):

$$Y = \begin{pmatrix} a_{11} & a_{12} & a_{13} \\ a_{21} & a_{22} & a_{23} \\ a_{31} & a_{32} & a_{33} \end{pmatrix} X \quad (1)$$

where X is a point on the RGB space and Y is a point on the XYZ space.

If it is assumed that $p_1$ is mapped into $q_1$, $p_2$ is mapped into $q_2$, and $p_3$ is mapped into $q_3$, each factor a can be calculated by Equations (2) to (10):

$$a_{13} = \frac{(x_4 y_1 - x_1 y_4)(x_2 x_7 - x_1 x_8) - (x_7 y_1 - x_1 y_7)(x_2 x_4 - x_1 x_5)}{(x_3 x_4 - x_1 x_6)(x_2 x_7 - x_1 x_8) - (x_3 x_7 - x_1 x_9)(x_2 x_4 - x_1 x_5)} \quad (2)$$

$$a_{23} = \frac{(x_4 y_2 - x_1 y_5)(x_2 x_7 - x_1 x_8) - (x_7 y_2 - x_1 y_8)(x_2 x_4 - x_1 x_5)}{(x_3 x_4 - x_1 x_6)(x_2 x_7 - x_1 x_8) - (x_3 x_7 - x_1 x_9)(x_2 x_4 - x_1 x_5)} \quad (3)$$

$$a_{33} = \frac{(x_4 y_3 - x_1 y_6)(x_2 x_7 - x_1 x_8) - (x_7 y_3 - x_1 y_9)(x_2 x_4 - x_1 x_5)}{(x_3 x_4 - x_1 x_6)(x_2 x_7 - x_1 x_8) - (x_3 x_7 - x_1 x_9)(x_2 x_4 - x_1 x_5)} \quad (4)$$

$$a_{12} = \frac{(x_4 y_1 - x_1 y_4)(x_3 x_7 - x_1 x_4) - (x_7 y_1 - x_1 y_7)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (5)$$

$$a_{22} = \frac{(x_4 y_2 - x_1 y_5)(x_3 x_7 - x_1 x_9) - (x_7 y_2 - x_1 y_8)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (6)$$

$$a_{32} = \frac{(x_4 y_3 - x_1 y_6)(x_3 x_7 - x_1 x_9) - (x_7 y_3 - x_1 y_9)(x_3 x_4 - x_1 x_6)}{(x_2 x_4 - x_1 x_5)(x_3 x_7 - x_1 x_9) - (x_2 x_7 - x_1 x_8)(x_3 x_4 - x_1 x_6)} \quad (7)$$

$$a_{11} = \frac{y_1 - a_{12} x_1 - a_{13} x_3}{x_1} \quad (8)$$

$$a_{21} = \frac{y_2 - a_{22} x_2 - a_{23} x_3}{x_1} \quad (9)$$

$$a_{31} = \frac{y_3 - a_{32} x_2 - a_{33} x_3}{x_1} \quad (10)$$

Subsequently, the colorimetric value calculating unit 531 uses the linear transformation matrix (Y=AX), thereby mapping $P_{rgb}$ (whose coordinate values are ($P_r$, $P_g$, $P_b$)) in the RGB color space illustrated in (a) of FIG. 11 into the XYZ color space illustrated in (b) of FIG. 11 (Step S4). $P_{rgb}$ serves as the RGB value of the patch image 200 to be a target for color measurement. The XYZ value thus obtained is a relative value with respect to the origin $g_0$. Therefore, the actual XYZ value $P_{xyz}$ (whose coordinate values are ($P_x$, $P_y$, $P_z$)) corresponding to the RGB value $P_{rgb}$ of the patch image 200 to be a target for color measurement is represented as an offset value with respect to the origin $q_0$ ($y_{01}$, $y_{02}$, $y_{03}$) by Equations (11) to (13):

$$P_x = y_{01} + a_{11} \times P_r + a_{12} \times P_g + a_{13} \times P_b \quad (11)$$

$$P_y = y_{02} + a_{21} \times P_r + a_{22} \times P_g + a_{23} \times P_b \quad (12)$$

$$P_z = y_{03} + a_{31} \times P_r + a_{32} \times P_g + a_{33} \times P_b \quad (13)$$

The colorimetric value calculating unit 531 then converts the XYZ value $P_{xyz}$ of the patch image 200 thus calculated into the L*a*b* value by the conversion equation illustrated in FIG. 12A, thereby calculating the L*a*b* value corresponding to the RGB value $P_{rgb}$ of the patch image 200 to be a target for color measurement (Step S5). Therefore, even if the sensitivity of the sensor unit 430 changes, or even if the wavelength and the intensity of the illumination light source 426 change, the colorimetric value of the patch image 200 to be a target for color measurement can be calculated accurately. As a result, it is possible to perform color measurement with high accuracy. In the present embodiment, the patch image 200 formed by the image forming apparatus 100 is the target for color measurement. Alternatively, an arbitrary image output by the image forming apparatus 100 may be a target for color measurement. For example, the image forming apparatus 100 can output an image while performing color measurement on a part of the image, thereby adjusting the output characteristics of the image forming apparatus 100 in real time.

In FIG. 11, (c) used in the processing described above illustrates the state achieved by plotting the L*a*b* value of each patch of the patch array 401 in the primary color (YMC) and the patch array 402 in the secondary color (RGB) in the reference chart 400 illustrated in FIG. 5 on the L*a*b* color space. Because the reference chart 400 illustrated in FIG. 5 is formed on the chart plate 410 arranged inside of the housing 421 of the image capturing unit 42, the number of patches constituting the reference chart 400 is restricted. Therefore, the reference chart 400 illustrated in FIG. 5 is formed by using a part of patches selected from the standard patches. Japan Color has 928 colors, for example, and the reference chart 400 illustrated in FIG. 5 is formed by using a part (e.g., 72 colors) selected from the 928 colors. However, if color measurement is performed by using a part of patches selected from the standard patches alone, the accuracy in the color measurement may possibly deteriorate. Therefore, it is preferable that color measurement be performed on the patch image 200 to be a target for color measurement by analogizing the RGB values of the standard patches from the RGB values of the patches constituting the reference chart 400, and by using the RGB values of the standard patches.

Figure 14:
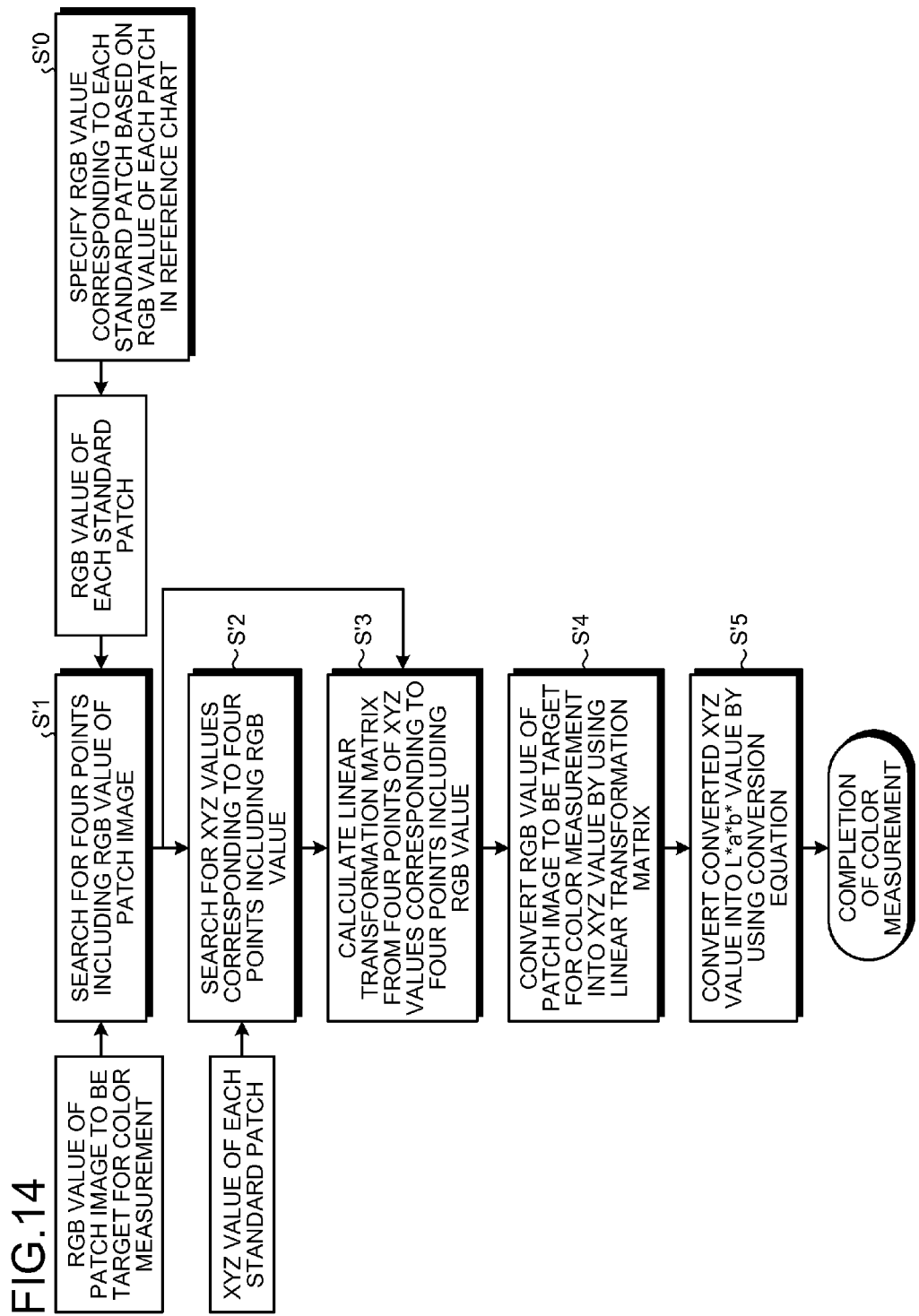
FIG. 14 is a flowchart illustrating a modification of the process of color measurement of the patch image.

Specifically, the L*a*b* values of the standard patches are stored in the storage unit 56. As illustrated in FIG. 14, the RGB value search unit 534 specifies the RGB value corresponding to each standard patch based on the RGB value of each patch in the reference chart 400 obtained by image capturing of the sensor unit 430 (Step S'0). Based on the RGB value of each standard patch thus specified, the RGB value search unit 534 searches for four points including the RGB value of the patch image 200 to be a target for color measurement (Step S'1).

Figure 15:
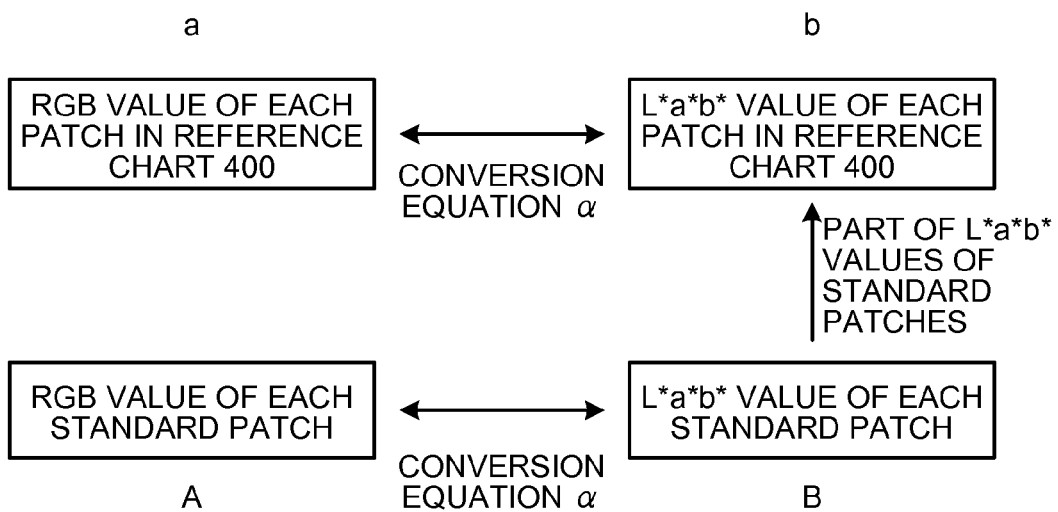
FIG. 15 is a view for explaining a method for specifying the RGB value corresponding to the L*a*b* value of each standard patch.

As illustrated in FIG. 15, the RGB value (a) of each patch of the reference chart 400 corresponds to the L*a*b* value (b) of each patch of the reference chart 400 by a conversion equation α (b=a×α). Therefore, based on the RGB value of each patch constituting the reference chart 400, the equation α is calculated. Furthermore, the L*a*b* value of each patch of the reference chart 400 is a part of the L*a*b* values of the standard patches. Thus, the RGB value (A) of each standard patch corresponds to the L*a*b* value (B) of each standard patch by the conversion equation α (B=A×α). Therefore, based on the conversion equation α thus calculated, the RGB value corresponding to the L*a*b* value of each standard patch can be specified. As a result, based on the RGB value of each patch in the reference chart 400, it is possible to specify the RGB value corresponding to the L*a*b* value of each standard patch.

Based on the XYZ value corresponding to the L*a*b* value of each standard patch, the RGB value search unit 534 then searches for the XYZ values corresponding to the four points including the RGB value of the patch image 200 to be a target for color measurement (Step S'2).

Based on the XYZ values corresponding to the four points searched for at Step S'2, the linear transformation matrix calculating unit 535 then calculates a linear transformation matrix (Step S'3). Based on the linear transformation matrix thus calculated, the colorimetric value calculating unit 531 converts the RGB value of the patch image 200 to be a target of color measurement into the XYZ value (Step S'4). Subsequently, the colorimetric value calculating unit 531 converts the XYZ value converted at Step S'4 into the L*a*b* value by using the conversion equation described above (Step S'5). As a result, based on the RGB value and the XYZ value of each standard patch, the L*a*b* value of the patch image 200 to be a target for color measurement can be obtained. Therefore, it is possible to perform color measurement on the patch image 200 with high accuracy. It is to be noted that the standard patches are not limited to Japan Color. Alternatively, for example, standard colors, such as Specifications for Web Offset Publications (SWOP) employed in the United States and Euro Press employed in Europe, can be used.

The image forming apparatus 100 according to the present embodiment forms an image on the recording medium 16 by a dot matrix. The image forming apparatus 100 reproduces a desired color by superimposing ink of YMCK, for example. However, if positional deviation occurs in the image, the image deteriorates, and the colorimetric value itself obtained from the patch image 200 changes.

In the case where the color of the image changes because of positional deviation in the image formed on the recording medium 16, if the color of the image is to be corrected only by the ejection amount of ink, the balance between the ejection amounts of ink is disturbed. As a result, an excellent image fails to be formed. Therefore, it is preferable that the positional deviation in the image be measured and corrected before the color measurement is performed on the patch image 200.

Method for Measuring Positional Deviation in the Image

Figure 16:
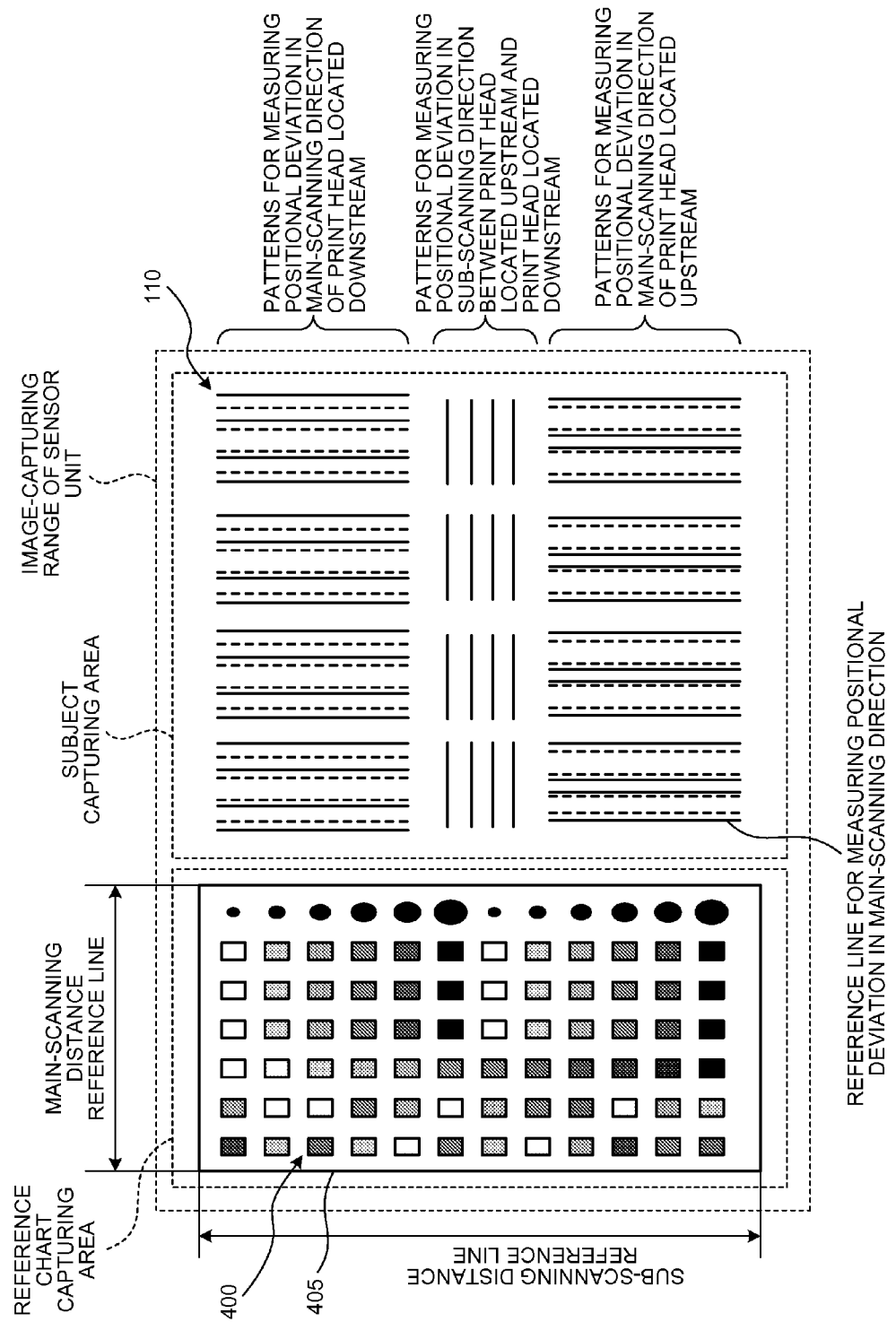
FIG. 16 is a view of an example of image data obtained by the sensor unit capturing a test pattern for measuring positional deviation and the reference chart simultaneously.
Figure 19:
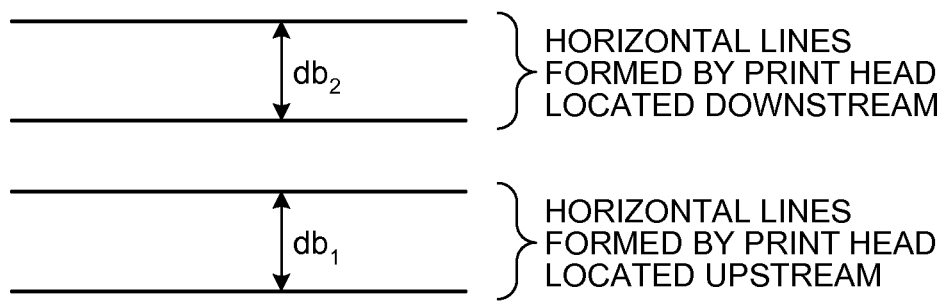
FIG. 19 is a view for explaining a method for measuring positional deviation in the image in a sub-scanning direction.
Figure 20:
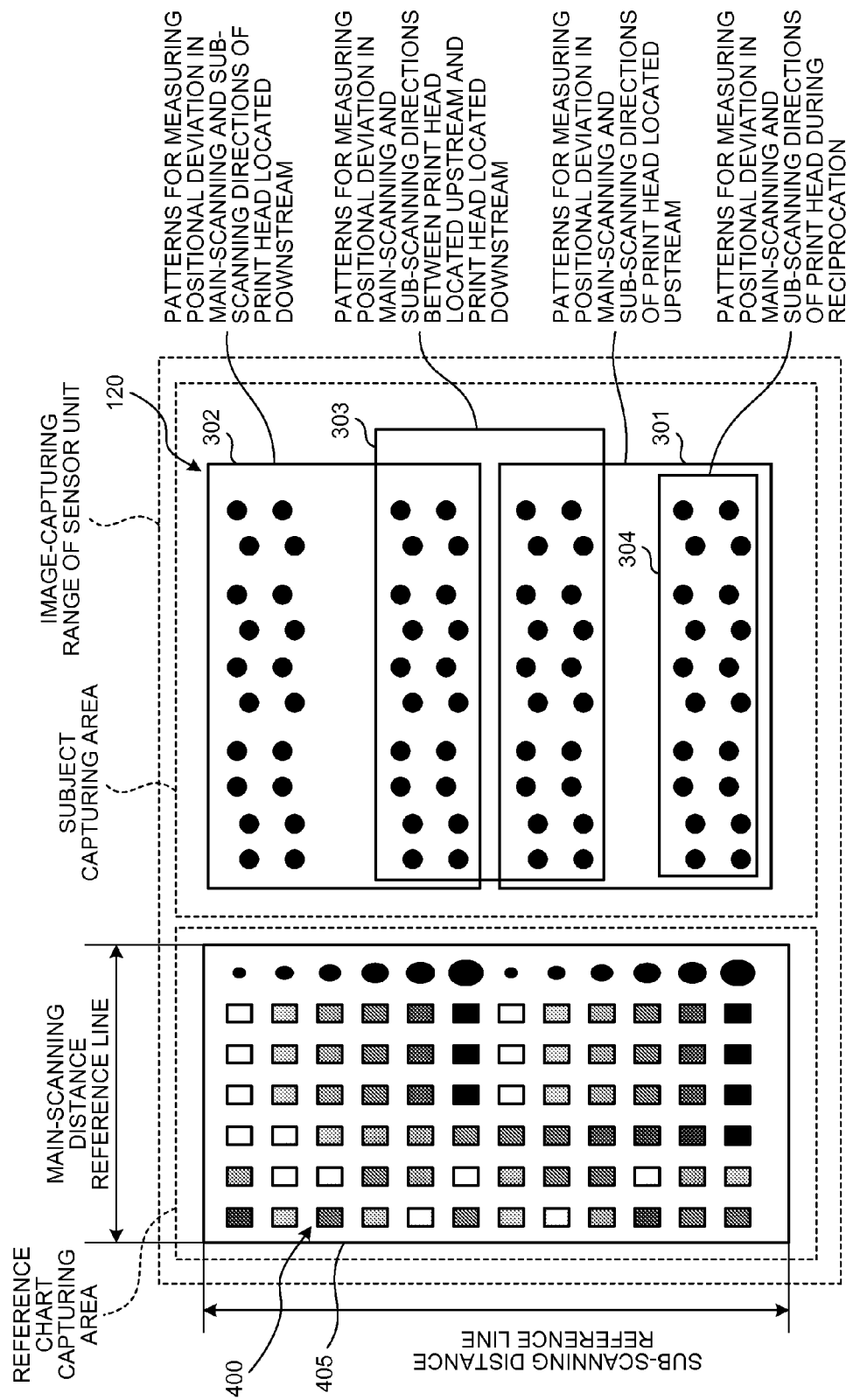
FIG. 20 is a view of an example of image data obtained by the sensor unit capturing another test pattern for measuring positional deviation and the reference chart simultaneously.

A specific example of the method for measuring positional deviation in the image by using the color measuring device will now be described in greater detail with reference to FIG. 16 to FIG. 20. FIG. 16 is a view of an example of image data obtained by the sensor unit 430 capturing a test pattern 110 serving as an example of an image for measuring positional deviation and the reference chart 400 simultaneously. FIG. 17 and FIG. 18 are views for explaining a method for measuring positional deviation in the image in the main-scanning direction. FIG. 19 is a view for explaining a method for measuring positional deviation in the image in the sub-scanning direction. FIG. 20 is a view of an example of image data obtained by the sensor unit 430 capturing a test pattern 120 serving as another example of the image for measuring positional deviation and the reference chart 400 simultaneously.

To measure positional deviation in an image, the image forming apparatus 100 forms the test pattern 110 serving as a predetermined image for measuring positional deviation on the recording medium 16. Subsequently, the sensor unit 430 included in the image capturing unit 42 of the color measuring device captures the test pattern 110 formed on the recording medium 16 and the reference chart 400 simultaneously. As a result, the image data including the test pattern 110 and the reference chart 400 illustrated in FIG. 16 is obtained, for example.

The image data of the test pattern 110 and the reference chart 400 captured by the sensor unit 430 is processed by the image processing unit 45. Subsequently, the image data is transmitted from the image capturing unit 42 to the color measurement control unit 50 via the interface unit 46, and is stored in the frame memory 51 of the color measurement control unit 50. The positional deviation amount calculating unit 532 of the arithmetic unit 53 then reads the image data stored in the frame memory 51, and measures positional deviation in the image.

Vertical lines (solid lines) in the lower area of the test pattern 110 illustrated in FIG. 16 are patterns for measuring relative positional deviation in the main-scanning direction of the print head 6 located upstream. Vertical lines (solid lines) in the upper area of the test pattern 110 are patterns for measuring relative positional deviation in the main-scanning direction of the print head 6 located downstream. Horizontal lines (solid lines) in the middle of the test pattern 110 are patterns for measuring relative positional deviation in the sub-scanning direction between the print head 6 located upstream and the print head 6 located downstream. Vertical dotted lines in FIG. 16 illustrate the ideal positions of the vertical lines to be recorded on the recording medium 16 when no positional deviation occurs in the main-scanning direction. Therefore, the vertical dotted lines are not actually recorded on the recording medium 16.

The relative positional deviation in the main-scanning direction of the print head 6 located upstream is measured by: using the image data of the test pattern 110 captured by the sensor unit 430; measuring gaps between the vertical lines (solid lines) actually formed on the recording medium 16 by shifting the print head 6 by a predetermined gap da; and calculating the difference between the actual positions of the vertical lines (solid lines) formed on the recording medium 16 and the ideal positions of the vertical lines (dotted lines) to be formed on the recording medium 16 when no positional deviation occurs in the main-scanning direction as the amount of positional deviation in the main-scanning direction. The gaps between the vertical lines (solid lines) actually formed on the recording medium 16 are measured by using the black vertical line formed on the leftmost side as a reference line for measuring positional deviation in the main-scanning direction.

Specifically, as illustrated in FIG. 17, by using the first black vertical line formed on the leftmost side as the reference line for measuring positional deviation in the main-scanning direction, gaps ($xd_1$, $xd_2$, and $xd_3$) between the reference line and the vertical lines actually formed are measured. As a result, it is possible to grasp the actual positions of the vertical lines. Subsequently, the difference ($\Delta xd_1$, $\Delta xd_2$, and $\Delta xd_3$) between the actual positions of the vertical lines (solid lines) and the ideal positions of the vertical lines (dotted lines) is measured. The difference ($\Delta xd_1$) between the actual position of the second vertical line and the ideal position of the vertical line can be calculated by $\Delta xd_1 = xd_1 - da$. The difference ($\Delta xd_2$) between the actual position of the third vertical line and the ideal position of the vertical line can be calculated by $\Delta xd_2 = xd_2 - 2da$. The difference ($\Delta xd_3$) between the actual position of the third vertical line and the ideal position of the vertical line can be calculated by $\Delta xd_3 = xd_3 - 3da$. The difference ($\Delta xd_1$, $\Delta xd_2$, and $\Delta xd_3$) represents the relative positional deviation of the print head 6 located upstream in the main-scanning direction. Therefore, if the positional deviation in the main-scanning direction of the print head 6 located upstream is corrected based on the difference ($\Delta xd_1$, $\Delta xd_2$, and $\Delta xd_3$), the positions of the vertical lines (solid lines) actually recorded on the recording medium 16 coincide with the ideal positions of the vertical lines (dotted lines).

To measure the relative positional deviation in the main-scanning direction of the print head 6 located downstream, the method described above and illustrated in FIG. 17 is used. However, as illustrated in FIG. 16, the position of the first black vertical line formed on the leftmost side may be shifted with respect to the position of the reference line for measuring positional deviation in the main-scanning direction. Therefore, as illustrated in FIG. 18, the difference ($\Delta xd_o$) between the position of the first black vertical line recorded on the leftmost side and the position of the reference line for measuring positional deviation in the main-scanning direction is calculated. With the difference ($\Delta xd_0$), the position of the first black vertical line formed on the leftmost side is then corrected to the position of the reference line for measuring positional deviation in the main-scanning direction (ideal position). Subsequently, the method illustrated in FIG. 17 is used to measure the relative positional deviation in the main-scanning direction of the print head 6 located downstream. Thus, the positional deviation in the main-scanning direction is corrected.

To measure the deviation in the sub-scanning direction between the print head 6 located upstream and the print head 6 located downstream, four horizontal lines arranged in the middle in FIG. 16 are used. Among the four horizontal lines, two horizontal lines on the lower side are formed on the recording medium 16 by using the print head 6 located upstream. By contrast, two horizontal lines on the upper side are formed on the recording medium 16 by using the print head 6 located downstream. As illustrated in FIG. 19, the distances ($db_1$ and $db_2$) between the respective horizontal lines, and the difference therebetween ($\Delta db = db_1 - db_2$) is calculated as the amount of positional deviation in the sub-scanning direction between the print head 6 located upstream and the print head 6 located downstream. If the positional deviation in the sub-scanning direction between the print head 6 located upstream and the print head 6 located downstream is corrected based on the difference ($\Delta db$), the distances ($db_1$ and $db_2$) between the respective horizontal lines become equal to each other.

The distances of the sub-scanning distance reference line and the main-scanning distance reference line of the reference chart 400 are absolute distances. Therefore, the actual amount of positional deviation can be calculated by: measuring and storing the absolute distances of the sub-scanning distance reference line and the main-scanning distance reference line in advance; comparing the distances of the sub-scanning distance reference line and the main-scanning distance reference line on the image in FIG. 16 obtained by capturing the reference chart 400 with the absolute distances of the sub-scanning distance reference line and the main-scanning distance reference line thus stored, respectively; calculating the relative ratios between the distances on the image and the absolute distances; and multiplying the amount of positional deviation obtained from the test pattern 110 in the subject capturing area described above by the relative ratios. By correcting the positional deviation based on the actual amount of positional deviation, it is possible to correct the positional deviation with high accuracy.

The method for measuring positional deviation described above is a method for measuring the positional deviation in the image by using the test pattern 110 of a line pattern illustrated in FIG. 16. However, the method for measuring the positional deviation in the image is not limited to the method described above, and various types of methods can be applied thereto. For example, geometric positional deviation between the print heads 6 can be measured by using a test pattern 120 of a dot pattern illustrated in FIG. 20.

In the case of the test pattern 120 illustrated in FIG. 20, the amount of positional deviation in the main-scanning and sub-scanning directions of the print head 6 located upstream can be calculated by using dots in a first frame 301. The amount of positional deviation in the main-scanning and sub-scanning directions of the print head 6 located downstream can be calculated by using dots in a second frame 302. The amount of positional deviation in the main-scanning and sub-scanning directions between the print head 6 located upstream and the print head 6 located downstream can be calculated by using dots in a third frame 303. The amount of positional deviation in the main-scanning and sub-scanning directions of the print head 6 caused by the reciprocation of the carriage 5 can be calculated by using dots in a fourth frame 304.

Method for Measuring the Dot Diameter of the Image

Figure 21:
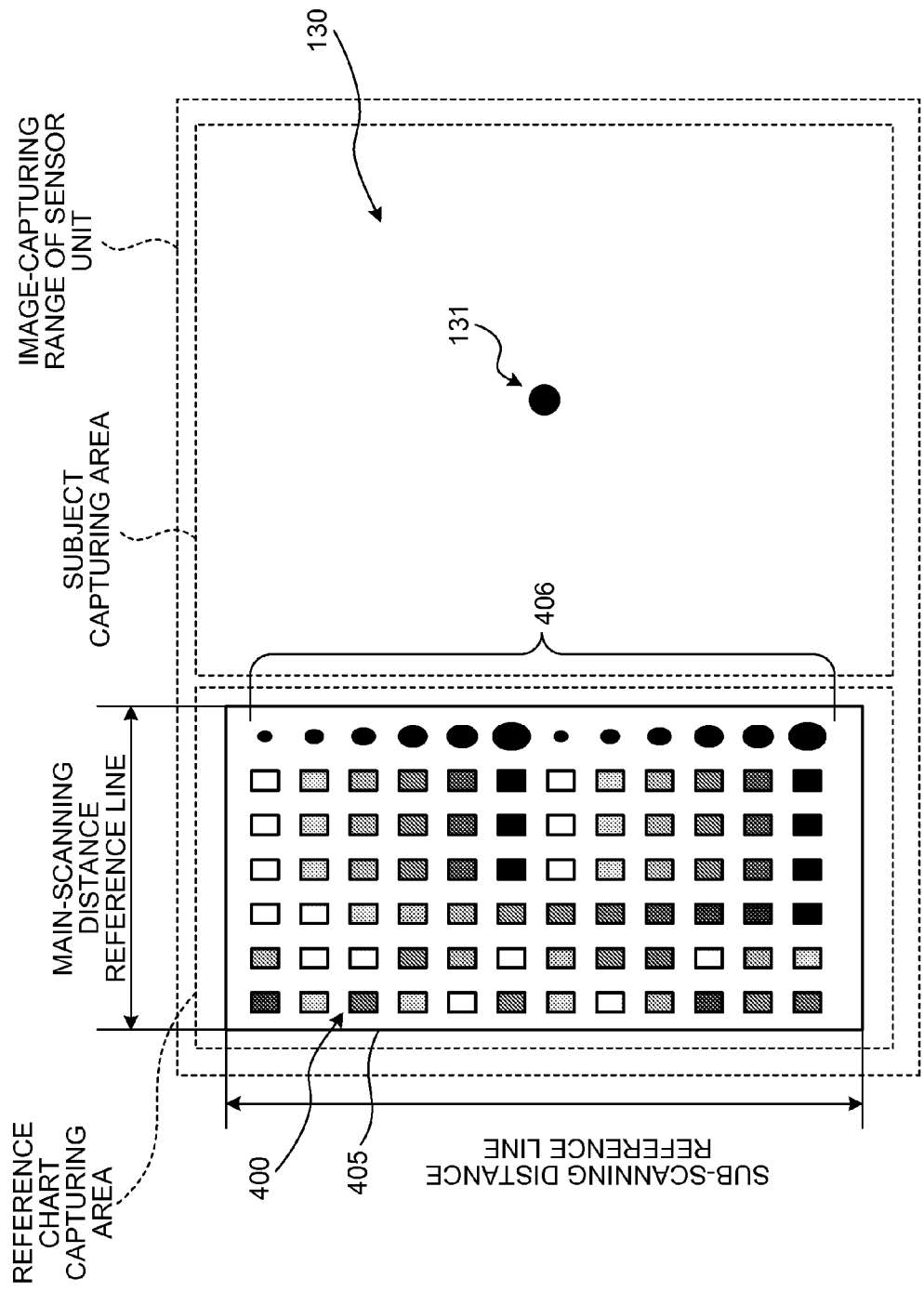
FIG. 21 is a view of an example of image data obtained by the sensor unit capturing a test pattern for measuring a dot diameter and the reference chart simultaneously.
Figure 22:
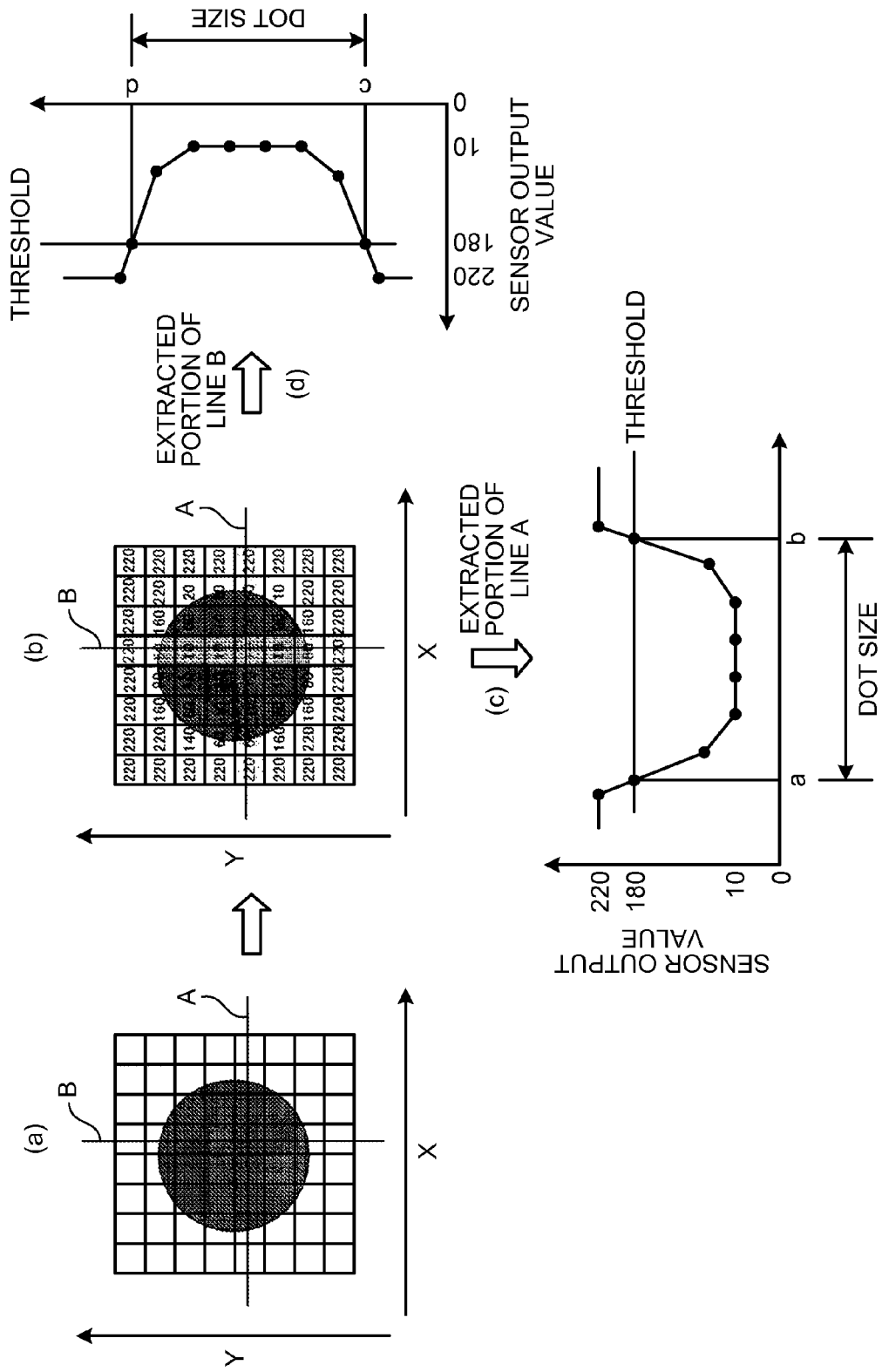
FIG. 22 illustrates a method for measuring the dot diameter from image data near the dot included in the test pattern.

A specific example of a method for measuring the dot diameter of the image by using the color measuring device will now be described in greater detail with reference to FIG. 21 and FIG. 22. FIG. 21 is a view of an example of image data obtained by the sensor unit 430 capturing a test pattern 130 serving as an image for measuring the dot diameter and the reference chart 400 simultaneously. FIG. 22 illustrates the method for measuring the dot diameter from image data near a dot included in the test pattern 130.

To measure the dot diameter of an image, the image forming apparatus 100 forms the test pattern 130 serving as a predetermined image for measuring the dot diameter on the recording medium 16. The test pattern 130 includes at least one dot 131. Subsequently, the sensor unit 430 included in the image capturing unit 42 of the color measuring device captures the test pattern 130 formed on the recording medium 16 and the reference chart 400 simultaneously. As a result, the image data including the test pattern 130 and the reference chart 400 illustrated in FIG. 21 is obtained, for example.

The image data of the test pattern 130 and the reference chart 400 captured by the sensor unit 430 is processed by the image processing unit 45. Subsequently, the image data is transmitted from the image capturing unit 42 to the color measurement control unit 50 via the interface unit 46, and is stored in the frame memory 51 of the color measurement control unit 50. The dot diameter calculating unit 533 of the arithmetic unit 53 then reads the image data stored in the frame memory 51, and measures the dot diameter of the image.

By performing pattern matching or the like, the dot diameter calculating unit 533 specifies the positions of the four corners 407 of the distance measurement pattern (main-scanning and sub-scanning distance reference lines) 405 in the reference chart 400 based on the image data read from the frame memory 51. As a result, it is possible to specify the position of the reference chart 400 in the image data. After specifying the position of the reference chart 400, the dot diameter calculating unit 533 specifies the positions of the dot diameter measurement patterns constituting the pattern array 406.

Subsequently, the dot diameter calculating unit 533 compares the dot 131 included in the test pattern 130 with each of the dot diameter measurement patterns constituting the pattern array 406 in the reference chart 400 by processing performed on the image data. The dot diameter calculating unit 533 then specifies a dot diameter measurement pattern having the same size as that of the dot 131 included in the test pattern 130 among the dot diameter measurement patterns constituting the pattern array 406. Thus, the dot diameter calculating unit 533 calculates the dot diameter, which is the size of the dot 131 output on the recording medium 16 by the image forming apparatus 100.

In FIG. 22, (a) illustrates pixels of the dot 131 and pixels near the dot 131 included in the test pattern 130, and (b) of FIG. 22 illustrates the values of the pixels of the dot 131 and the pixels near the dot 131. If a line A serving as an array in the X-axis direction illustrated in (a) of FIG. 22 is extracted, and the values of pixels constituting the line A are connected in a line, a graph of the sensor output value illustrated in (c) of FIG. 22 can be obtained. If a predetermined threshold is used, and the sensor output value exceeding the threshold is detected, two intersection points a and b can be obtained. By calculating the distance between the two points a and b, it is possible to specify the size of the dot 131 on the line A. Because it is not clear where the dot 131 is detected in the subject capturing area, the processing for specifying the size of the dot 131 in the X-axis direction described above is performed from one side to the other in the Y-axis direction. The largest distance between the two points among the distances therebetween obtained by the processing described above is determined to be the size of the dot 131 in the X-axis direction.

Similarly, if a line B serving as an array in the Y-axis direction illustrated in (a) of FIG. 22 is extracted, and the values of pixels constituting the line B are connected in a line, a graph of the sensor output value illustrated in (d) of FIG. 22 can be obtained. If a predetermined threshold similar to the one described above is used, and the sensor output value exceeding the threshold is detected, two intersection points c and d can be obtained. By calculating the distance between the two points c and d, it is possible to specify the size of the dot 131 on the line B. Because it is not clear where the dot 131 is detected in the subject capturing area, the processing for specifying the size of the dot 131 in the Y-axis direction described above is performed from one side to the other in the X-axis direction. The largest distance between the two points among the distances therebetween obtained by the processing described above is determined to be the size of the dot 131 in the Y-axis direction.

With this processing, it is possible to specify the size of the dot 131 included in the test pattern 130 in the X-axis direction and the Y-axis direction. As a result, it is possible to specify the relative size of the dot 131 in the image captured by the sensor unit 430. In the example illustrated in FIG. 22, the threshold for the sensor output value is set to 180. However, the threshold is given just as an example, and the optimum threshold capable of extracting the edge portion of the dot 131 accurately may be used.

The size of the dot 131 obtained by the processing described above is the relative size of the dot 131 in the image captured by the sensor unit 430. To replace the relative size of the dot 131 with the dot diameter, which is the absolute size of the dot 131 output to the recording medium 16 by the image forming apparatus 100, the pattern array 406 included in the reference chart 400 captured simultaneously with the test pattern 130 is used. In other words, a dot diameter measurement pattern having the closest size to the relative size of the dot 131 obtained by the processing described above is specified among the dot diameter measurement patterns constituting the pattern array 406. The dot diameters corresponding to the dot diameter measurement patterns constituting the pattern array 406 are measured and stored in advance. Therefore, by specifying the dot diameter measurement pattern having the closest size to the relative size of the dot 131 obtained by the processing described above, it is possible to calculate the dot diameter, which is the absolute size of the dot 131 output to the recording medium 16 by the image forming apparatus 100.

Modifications of the image capturing unit 42 will now be described. In the modifications, components common to the image capturing unit 42 are represented by similar reference numerals, and an overlapping explanation thereof will be omitted.

First Modification

Figure 23A:
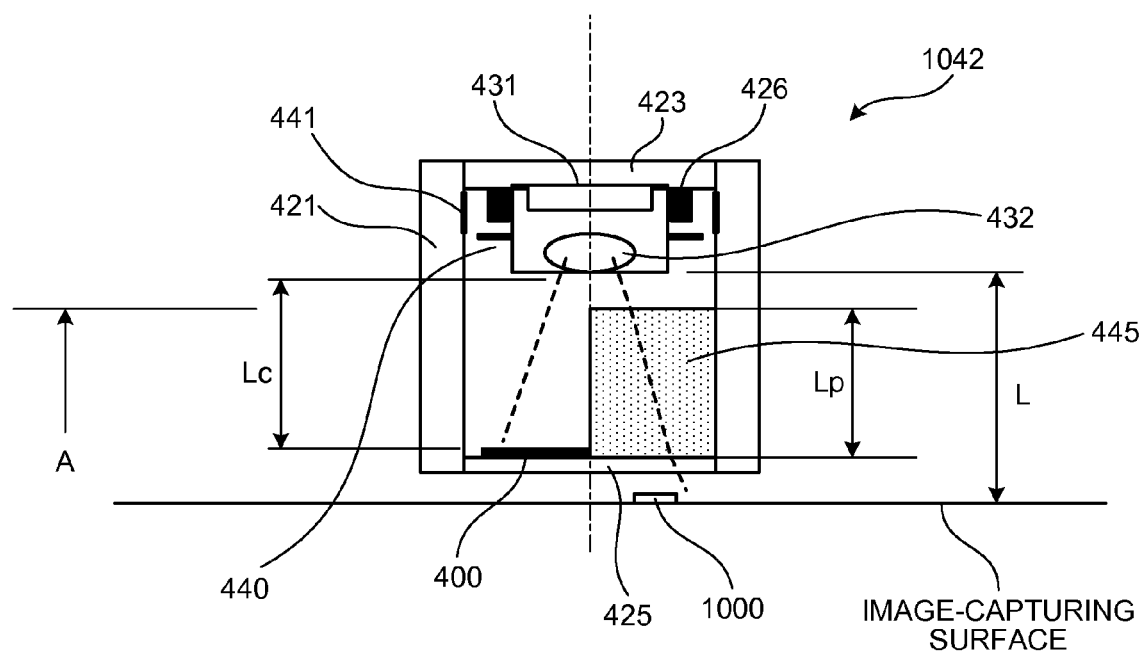
FIGS. 23A and 23B are views for explaining a first modification of the image capturing unit.
Figure 23B:
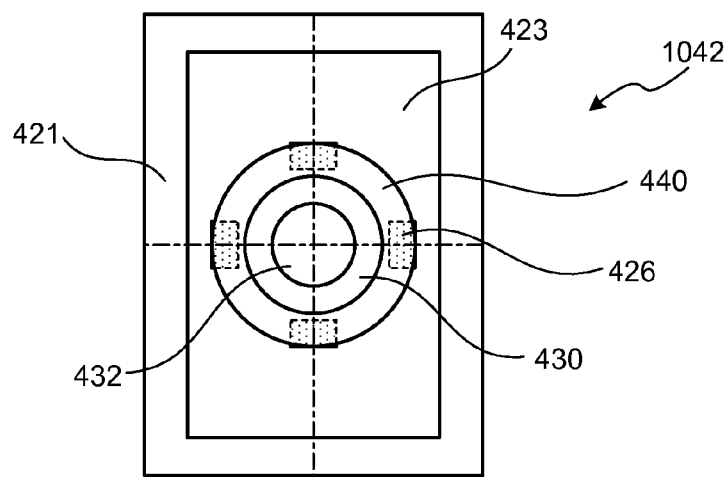

FIG. 23A is a longitudinal-sectional view of an image capturing unit 1024 according to a first modification, and FIG. 23B is a top view of the image capturing unit 1024, viewed from the arrow A of FIG. 23A. In the image capturing unit 1024, as illustrated in FIGS. 23A and 23B, a diffusion light blocking plate 440 is provided in the housing 421 such that the reference chart 400 and a test pattern 1000 are prevented from being directly irradiated with the light from the illumination light source 426. Furthermore, a white diffusing surface 441 may be provided to the inner surface of the housing 421 such that the reference chart 400 and the test pattern 1000 are indirectly irradiated with the light from the illumination light source 426. A transparent member 445 is arranged in the image capturing unit 1042. The transparent member 445 causes the focal position of the reference chart 400 and the focal position of the test pattern 1000 to coincide with each other.

Second Modification

Figure 24:
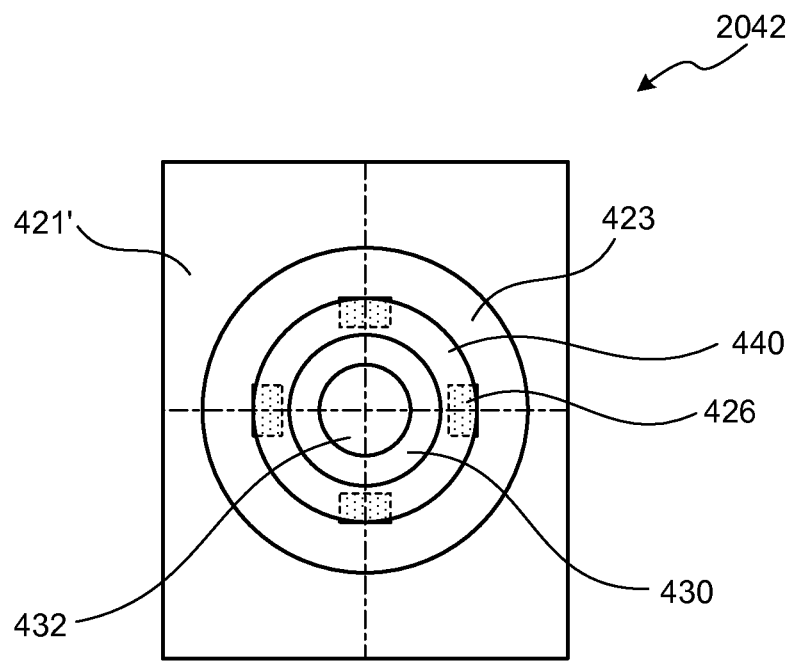
FIG. 24 is a view for explaining a second modification of the image capturing unit.

The inner surface of the housing 421 of the image capturing unit 1042 in the first modification is formed in a rectangular shape as illustrated in FIG. 23B. However, the inner surface of the housing 421 may be formed in a circular shape. FIG. 24 is a top view of an image capturing unit 2042 according to a second modification, viewed from as FIG. 23B. The inner surface of a housing 421' has a circular shape as illustrated in FIG. 24. Therefore, the distances in which the light travels from the light source 423 to the inner surface of the housing 421' can be equalized. As a result, it is possible to further equalize the illuminance on the surface of the reference chart 400 and the surface of the test pattern 1000.

Third Modification

Figure 25A:
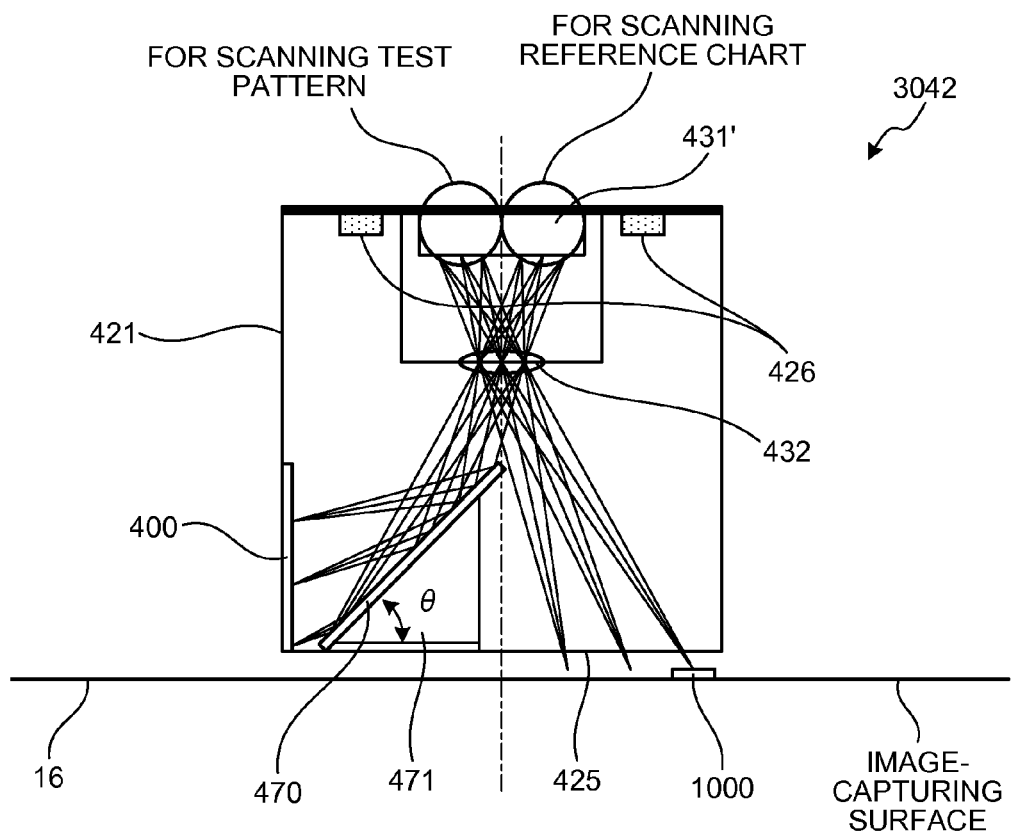
FIGS. 25A and 25B are views for explaining a third modification of the image capturing unit.
Figure 25B:
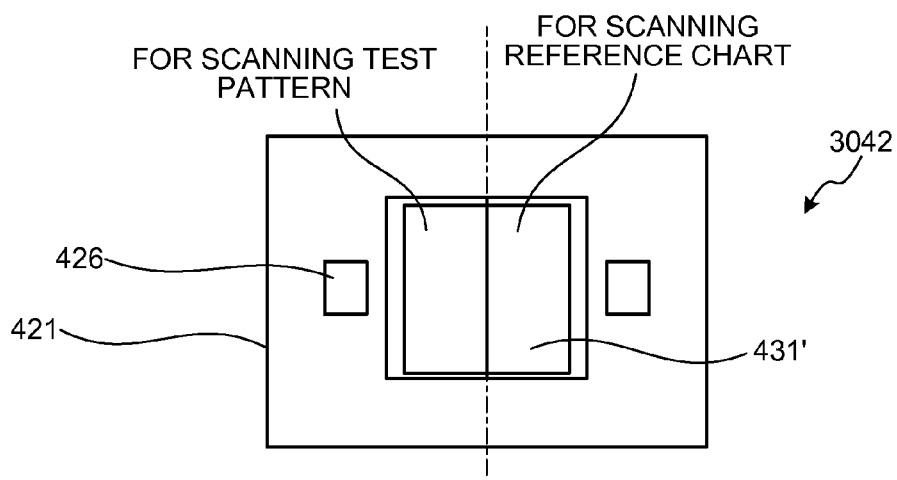

In the configuration described above, the transparent member 445 is arranged in the image capturing unit 1042 of the first embodiment so that the transparent member 445 causes the focal position of the reference chart 400 and the focal position of the test pattern 1000 to coincide with each other. However, the coincidence of the focal positions may be realized by a reflecting member. FIG. 25A is a longitudinal-sectional view of an image capturing unit 3024 according to a third modification, and FIG. 25B is a top view of the image capturing unit 3024, viewed from as the FIG. 23B. As illustrate in FIG. 25A, a reflecting member 470 is arranged in the image capturing unit 3042 to cause the focal position of the reference chart 400 and the focal position of the test pattern 1000 to coincide with each other. The image capturing unit 3042 having the configuration of FIGS. 25A and 25B can also capture the test pattern 1000 and the reference chart 400 simultaneously. By comparing a dot of the test pattern 1000 with the patterns constituting the circular pattern array 406 in the reference chart 400 based on the image captured by the image capturing unit 3042, it is possible to determine the size of the dot.

The image capturing unit 3042 includes the housing 421 having the opening 425 on the image-capturing surface side, a two-dimensional image sensor 431', the light illumination sources (LED) 426, the imaging lens 432, the reflecting member 470, a supporting member 471, and the reference chart 400.

The housing 421 is formed as the exterior of the image capturing unit 3042, and has the opening 425 on the image-capturing surface side. As illustrated in FIG. 25B, the inner surface of the housing 421 is formed in a rectangular shape, and the reference chart 400 is arranged thereon as illustrated in FIG. 25A. The two-dimensional sensor 431' captures the reference chart 400 and a subject (test pattern 1000) simultaneously, thereby acquiring a two-dimensional captured image including the reference chart 400 and the test pattern

1000. The illumination light sources 426 irradiate the reference chart 400 and the test pattern 1000 with light. The imaging lens 432 is a lens that magnifies the image, and places the focal plane on the test pattern 1000. The reflecting member 470 is a member that reflects light, and has a predetermined reflectance. The reflecting member 470 places the focal plane on the reference chart 400 arranged on the inner surface of the housing 421. The supporting member 471 has a slope with a predetermined angle θ, and supports the reflecting member 470.

The image capturing unit 3042 captures the test pattern 1000 in an area nearly half of the image-capturing area of the two-dimensional image sensor 431'. The imaging lens 432 places the focal plane on the test pattern 1000. Furthermore, the image capturing unit 3042 captures the reference chart 400 in an area nearly half of the image-capturing area of the two-dimensional image sensor 431'. The reflecting member 470 places the focal plane on the reference chart 400.

In the image capturing unit 3042, the reflecting member 470 is arranged such that the focal plane is placed on the reference chart 400. Thus, the focal position of the reference chart 400 and the focal position of the test pattern 1000 coincide with each other.

In the image capturing unit 3042, the illumination light sources 426 are used to irradiate the reference chart 400 and the test pattern 1000 with the light. Thus, the two-dimensional sensor 431' captures the reference chart 400 and the test pattern 1000 simultaneously under the same illumination conditions.

Fourth Modification

In FIG. 25B, the supporting member 471 supporting the reflecting member 470 by the predetermined angle (θ) is arranged in the housing 421. The reflecting member 470 is placed on the supporting member 471, thereby causing the focal position of the reference chart 400 and the focal position of the test pattern 1000 to coincide with each other. However, the inclined angle of the reflecting member 470 may be variable.

Figure 26:
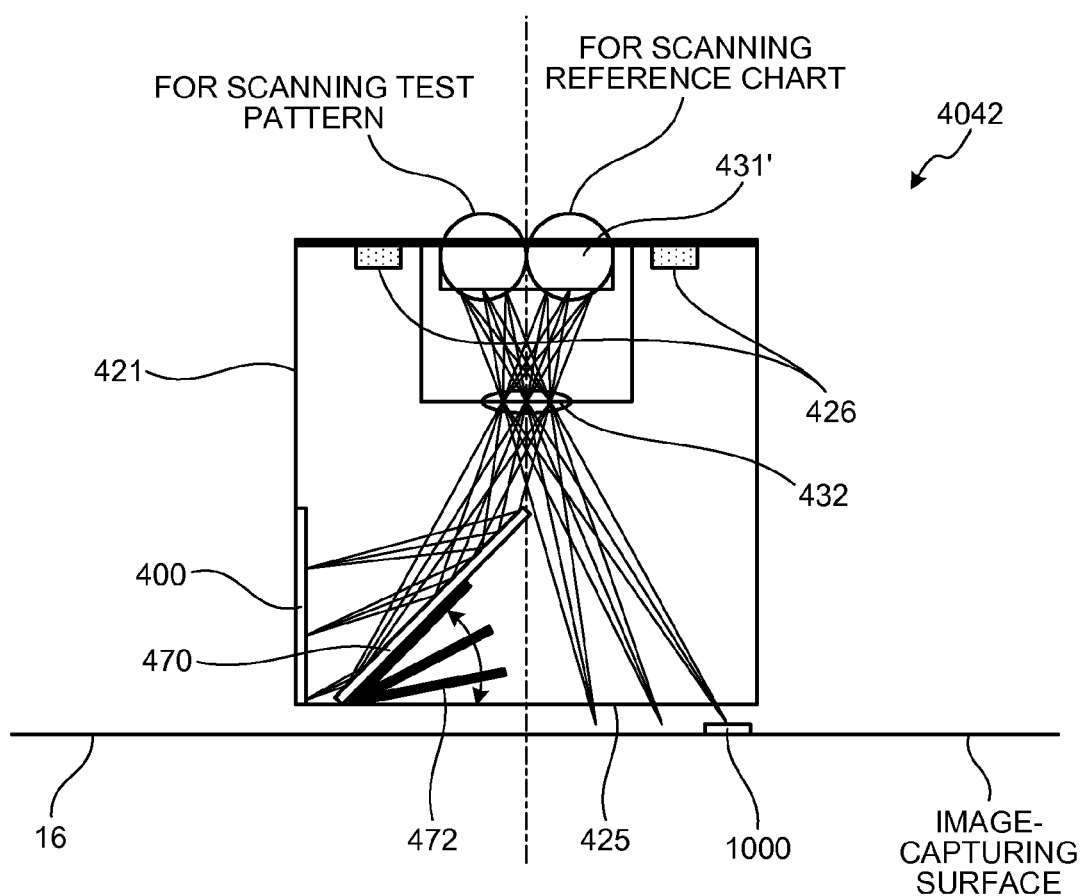
FIG. 26 is a view for explaining a fourth modification of the image capturing unit.

FIG. 26 is a longitudinal-sectional view of an image capturing unit 4042 according to a fourth modification. As illustrated in FIG. 26, a supporting member 472 that is made foldable in a non-step manner is provided on the image-capturing surface side of the housing 421 so that the reflecting member 470 causes the focal position of the reference chart 400 and the focal position of the test pattern 1000 to coincide with each other. A reflecting material is applied to the surface of the supporting member 472 so that the supporting member 472 itself serves as a reflecting member without the reflecting member 470.

Thus, the various types of configurations described above are applicable to the configuration of the image capturing unit according to the present embodiment as long as the reference chart 400 is arranged in the image capturing unit, and the focal position of the reference chart 400 and the focal position of the test pattern 1000 recorded on the recording medium 16 can coincide with each other.

The embodiment described above is given as a preferred embodiment of the present invention, and is not intended to limit the scope of the present invention. Various changes and modifications can be made without departing from the spirit and scope of the present invention.

The computer program executed in the present embodiment is provided in a manner incorporated in the ROM 118 in advance. However, it is not limited thereto. The computer program executed in the present embodiment may be provided as a computer program product in a manner recorded in a computer-readable recording medium, such as a compact disk read-only memory (CD-ROM), a flexible disk (FD), a compact disk recordable (CD-R), and a digital versatile disk (DVD), as a file in an installable or an executable format.

Furthermore, the computer program executed in the present embodiment may be provided in a manner stored in a computer connected to a network such as the Internet so as to be made available for downloads via the network. Moreover, the computer program executed in the present embodiment may be provided or distributed over a network such as the Internet.

The computer program executed in the present embodiment has a module configuration including the colorimetric value calculating unit 531, the RGB value search unit 534, and the linear transformation matrix calculating unit 535. In the actual hardware, by causing the host CPU 107 (processor) to read the computer program from the recording medium and to execute the computer program, each of the modules is loaded onto a main storage device, such as a memory, and the colorimetric value calculating unit 531, the RGB value search unit 534, and the linear transformation matrix calculating unit 535 are provided on the main storage device.

According to the embodiments, it is possible to provide a color measuring device that is reasonable in price and that facilitates improvement in the accuracy in color measurement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color measuring device comprising:
    a storage unit configured to store therein colorimetric values corresponding respectively to a plurality of colors constituting a reference chart in a predetermined color space that is device-independent;
    an image capturing unit configured to capture the reference chart and a subject to be a target for color measurement simultaneously to acquire RGB values of the reference chart and RGB values of the subject;
    a search unit configured to search for at least RGB values of four points corresponding to vertices of a polyhedron in the reference chart, the polyhedron including a specified RGB value of the subject in an RGB color space;
    a calculating unit configured to calculate a linear transformation matrix for converting the RGB values of the four points in the reference chart into the colorimetric values corresponding to the RGB values of the four points stored in the storage unit; and
    a conversion unit configured to convert the specified RGB value of the subject into a colorimetric value corresponding to the specified RGB value of the subject in the predetermined color space based on the linear transformation matrix.

2. The color measuring device according to claim 1, wherein the predetermined color space is an XYZ color space or an L*a*b* color space.

3. The color measuring device according to claim 1, wherein
    the reference chart includes a monochrome gray scale, and
    the conversion unit corrects the RGB values of the reference chart so that actual RGB values of gray scale obtained by the image capturing unit are ideal RGB values of the gray scale.

4. An image capturing device comprising the color measuring device according to claim 1.

5. An image forming apparatus comprising the image capturing device according to claim 4.

6. An image forming apparatus comprising the color measuring device according to claim 1.

7. A color measurement method comprising:
- capturing a reference chart and a subject to be a target for color measurement simultaneously to acquire RGB values of the reference chart and RGB values of the subject, a plurality of colors constituting the reference chart being stored in advance as colorimetric values in a predetermined color space that is device-independent, respectively;
- searching for at least RGB values of four points corresponding to vertices of a polyhedron in the reference chart, the polyhedron including a specified RGB value of the subject in an RGB color space;
- calculating a linear transformation matrix for converting the RGB values of the four points in the reference chart into the colorimetric values corresponding to the RGB values of the four points; and
- converting the specified RGB value of the subject into a colorimetric value corresponding to the specified RGB value of the subject in the predetermined color space based on the linear transformation matrix.

8. A computer program product comprising a non-transitory computer readable medium including programmed instructions, wherein the instructions cause a computer to execute:
- capturing a reference chart and a subject to be a target for color measurement simultaneously to acquire RGB values of the reference chart and RGB values of the subject, a plurality of colors constituting the reference chart being stored in advance as colorimetric values in a predetermined color space that is device-independent, respectively;
- searching for at least RGB values of four points corresponding to vertices of a polyhedron in the reference chart, the polyhedron including a specified RGB value of the subject in an RGB color space;
- calculating a linear transformation matrix for converting the RGB values of the four points in the reference chart into the colorimetric values corresponding to the RGB values of the four points; and
- converting the specified RGB value of the subject into a colorimetric value corresponding to the specified RGB value of the subject in the predetermined color space based on the linear transformation matrix.

* * * * *